(12) United States Patent
Golitschek Edler Von Elbwart et al.

(10) Patent No.: US 7,957,482 B2
(45) Date of Patent: Jun. 7, 2011

(54) BIT-OPERATED REARRANGEMENT DIVERSITY FOR AICO MAPPING

(75) Inventors: Alexander Golitschek Edler Von Elbwart, Darmstadt (DE); Christian Wengerter, Kleinheubach (DE); Isamu Yoshii, Frankfurt (DE)

(73) Assignee: Panasonic Corporation, Osaka (JP)

( * ) Notice: Subject to any disclaimer, the term of this patent is extended or adjusted under 35 U.S.C. 154(b) by 607 days.

(21) Appl. No.: 11/996,964

(22) PCT Filed: Jul. 26, 2005

(86) PCT No.: PCT/EP2005/008111
§ 371 (c)(1),
(2), (4) Date: May 8, 2008

(87) PCT Pub. No.: WO2007/012339
PCT Pub. Date: Feb. 1, 2007

(65) Prior Publication Data
US 2008/0232510 A1    Sep. 25, 2008

(51) Int. Cl.
*H04L 5/12* (2006.01)
(52) U.S. Cl. ......... 375/261; 375/298; 375/340; 375/324
(58) Field of Classification Search .................. 375/261, 375/298, 340, 324
See application file for complete search history.

(56) References Cited

U.S. PATENT DOCUMENTS

| | | | | |
|---|---|---|---|---|
| 6,091,784 A | * | 7/2000 | Park et al. | 375/298 |
| 6,438,112 B1 | * | 8/2002 | Piret et al. | 370/298 |
| 7,324,472 B2 | * | 1/2008 | Dottling et al. | 370/328 |

FOREIGN PATENT DOCUMENTS

| | | |
|---|---|---|
| EP | 1 293 059 | 3/2004 |
| WO | 2004/036817 | 4/2004 |

(Continued)

OTHER PUBLICATIONS

International Search Report dated Apr. 7, 2006.

(Continued)

*Primary Examiner* — Kabir A Timory
(74) *Attorney, Agent, or Firm* — Dickinson Wright PLLC

(57) ABSTRACT

Transmit diversity system in which constellation rearrangement is used. Both diversity signals contain the same data and both are 16-QAM, but the location of the data bits within the constellation is different. This averages the effect of the different levels of reliability of the different constellation points. A method for modifying a quadruple of data bits in a data transmission system using Quadrature. Amplitude Modulation with 16 different modulation states, 16-QAM, using an Antipodal Inverted Constellation AICO) mapping, swapping bits selecting contiguous symbol regions with bits selecting non-contiguous symbol regions. Depending on the particular pre-defined mapping and on the particular permutation of bits, inversion of selected bits may be performed in addition. The quadruples thus obtained are mapped to modulation symbols according to a pre-defined AICO mapping. In the corresponding method for receiving the symbols, likelihood values are swapped and modified in a way which is complementary to the permutation and inversion of bits, before they are combined with likelihood values from other symbols representing the same bits. Method ensures that there is a one to one correspondence between Hamming distance and Euclidian distance for the combined received data. In other words it ensures that, once combined, all 4 bit data words which differ by the same number of bits (Hamming distance) are the same distance apart in the constellation (Euclidian distance).

28 Claims, 13 Drawing Sheets

FOREIGN PATENT DOCUMENTS

WO 2006/117014 11/2006

OTHER PUBLICATIONS

"Enhanced HARQ Method with Signal Constellation Rearrangement," TSG-RAN Working Group 1 Meeting, No. 19, Feb. 27, 2001, pp. 1-3.

C. Wengerter, et al., "Constellation Rearrangement: Enhancement for Multilevel Modulation Formats and Transmit Diversity," Wireless Personal Communications, vol. 29, No. 1/2, Apr. 2004, pp. 35-45.

"Enhanced HARQ Method with Signal Constellation Rearrangement," TSG-RAN Working Group 1 Meeting, No. 19, Feb. 27, 2001, pp. 1-11.

European Office Action dated Aug. 17, 2009.

\* cited by examiner

Hamming distance

Squared Euclidean distance i)
 vii)
 ii)
 viii)
 iii)
 ix)
 iv)
 x)
 v)
 xi)
 vi)
 xii)

US 7,957,482 B2

BIT-OPERATED REARRANGEMENT DIVERSITY FOR AICO MAPPING

BACKGROUND OF THE INVENTION

1. Field of the Invention

This invention is related to digital communication systems, and in particular to methods for transmitting and receiving a data bit stream in a communication system using a 16-QAM constellation and diversity rearrangement of the 16-QAM constellation. Further, apparatuses for performing the methods are provided.

2. Description of the Related Art

16-QAM

16-QAM (Quadrature Amplitude Modulation) is a digital modulation scheme which is commonly used for example in IMT 2000 based mobile communication systems, such as UMTS or CDMA 2000. The 16 modulation symbols are defined by distinct points in the complex signal space in which the 16-QAM constellation is commonly illustrated. Each of these points represents one 16-QAM symbol.

For binary information transmission systems, four different bits may be used to determine one of the existing 16-QAM symbols. Therefore one 16-QAM symbol consists of (or can be represented by) a word of 4 bits, and is represented in the transmission by a complex value in the complex plane (i.e. amplitude and phase of a carrier). Generally the complex value of a modulation symbol can be represented by its Cartesian in-phase- and quadrature-components (I and Q components) relative to the respective I-axis and Q-axis in the complex plane. These axes also divide the complex plane in four quadrants. The representation of a modulation symbol by its real and imaginary part in the complex plane is equivalent to its alternative representation by polar components, i.e. radius and angle.

For a better understanding of the invention, a specific constellation of the 16-QAM symbols is assumed here, where the signal points within a quadrant of the complex plane are arranged such that they form a square of four points in two orthogonal directions of the signal space. Consequently such a mapping is commonly known as square 16-QAM or lattice 16-QAM. Two examples are given in FIG. 1 and FIG. 2.

The invention assumes that the 16-QAM symbols are arranged using a square 16-QAM mapping. It should be apparent to the skilled person that for each rotated 16-QAM constellation as for example shown in FIG. 2, the axes of the complex plane may be chosen such that the rotated 16-QAM constellation can be viewed as in FIG. 1.

Commonly, the so-called Gray mapping is used to associate the 16 modulation symbols in a 16-QAM constellation with a quadruple of bits which is mapped to the respective symbol. According to this Gray mapping scheme, adjacent modulation symbols in the horizontal or vertical direction differ in one bit only.

16-QAM Subset Partitioning

Generally the set of symbols within a constellation may be partitioned into subsets to define the symbol regions that correspond to the logical value of a certain bit. Since for a 16-QAM constellation 4 bits are relevant, there are four subsets, one for each bit. Each subset may be further divided into two symbol regions that correspond to the two logical values of the respective bit in the corresponding subset.

Obviously, there exist various subset partitions. However some of these are equivalent for example from the viewpoint of error rate performance. Still there exist certain partitioning schemes that are more widely used than others. Four examples of subset partitioning schemes are given for example in Chindapol, A.; Ritcey, J. A., "Design, analysis, and performance evaluation for BICM-ID with square QAM constellations in Rayleigh fading channels", IEEE Journal on Selected Areas in Communications, Volume: 19, Issue: 5, May 2001, Pages: 944-957 and also in FIG. 12-15 for the so-called Gray mapping.

Constellation Rearrangement for 16-QAM Gray Mapping

For Gray mapping, it has been shown that a constellation rearrangement approach improves the performance if two or more versions of the same word are transmitted. The constellation rearrangement scheme for Gray mapping is based on different levels of reliability for the bits, depending on the position of the selected 16-QAM symbols within the constellation. Consequently the rearrangement rules focus on changing the location of the rearranged version of the 16-QAM symbol to achieve an averaging effect of the levels of reliability. For details on constellation rearrangement for 16-QAM Gray mapping, it is referred to the granted patent EP 1,293, 059 B1 or the publication WO 2004/036817 A1 of the applicant.

Transmit Diversity Schemes

There exist several well known transmit diversity techniques. The term "transmit diversity" as used in this document describes the transmission of one or several versions relating to identical data on several (at least two) diversity branches. For example the following schemes are considered as transmit diversity (see e.g. J. D. Gibson, "The Mobile Communications Handbook", IEEE Press, 1996, Chapter 12.2):

Site Diversity The transmitted signal originates from different sites, e.g. different base stations in a cellular environment.

Antenna Diversity The transmitted signal originates from different antennas, e.g. different antennas of a multi antenna base station.

Polarization Diversity The transmitted signal is mapped onto different polarizations.

Frequency Diversity: The transmitted signal is mapped e.g. on different carrier frequencies or on different frequency hopping sequences.

Time Diversity The transmitted signal is e.g. mapped on different interleaving sequences. This includes ARQ schemes that re-transmit data upon request.

Code Diversity The transmitted signal is mapped on different codes in e.g. a CDMA (Code Division Multiple Access) system.

In the above referenced application and patent of the applicant respectively, it has been shown that the use of constellation rearrangement schemes together with transmit diversity may significantly improve the bit error rate of a transmitted signal in mobile communication environments. It is shown to be optimum considering four different constellations for 16-QAM Gray mapping. Nevertheless, there is still a demand for an optimization of modulation and coding schemes used for communications, in particular in a mobile communication environment, to reduce the number of required constellations or to improve the achieved error performance.

SUMMARY OF THE INVENTION

It is an object of the present invention to improve the physical error rate in a digital transmission system using 16-QAM and transmission diversity, while maintaining transmission efficiency. In order to keep the number of distinct modulator/mapping units within the transmission system at a minimum, an object of the present invention is the generation of the transmission diversity data on bit level prior to modulation/mapping.

This object is achieved by using a pre-defined Antipodal Inverted Constellation (Aico) Mapping, and permutating and optionally also inverting bits within quadruples of bits being mapped to one symbol such that:

1. Two quadruples of bits that have a Hamming distance of 1 and are mapped in their original version to modulation symbols . . .
   a) . . . with a squared Euclidean distance of 4D are mapped to symbols with a squared Euclidean distance of 16D after the permutation and inversion of bits;
   b) . . . with a squared Euclidean distance of 16D are mapped to symbols with a squared Euclidean distance of 4D after the permutation and inversion of bits.
2. Two quadruples of bits that have a Hamming distance of 2 and are mapped in their original version to modulation symbols . . .
   a) . . . with a squared Euclidean distance of 4D are mapped to symbols with a squared Euclidean distance of 36D after the permutation and inversion of bits;
   b) . . . with a squared Euclidean distance of 36D are mapped to symbols with a squared Euclidean distance of 4D after the permutation and inversion of bits;
   c) . . . with a squared Euclidean distance of 8D are mapped to symbols with a squared Euclidean distance of 32D after the permutation and inversion of bits;
   D) . . . with a squared Euclidean distance of 32D are mapped to symbols with a squared Euclidean distance of 8D after the permutation and inversion of bits;
   e) . . . with a squared Euclidean distance of 20D are mapped to symbols with a squared Euclidean distance of 20D after the permutation and inversion of bits.
3. Two quadruples of bits that have a Hamming distance of 3 and are mapped in their original version to modulation symbols . . .
   a) . . . with a squared Euclidean distance of 8D are mapped to symbols with a squared Euclidean distance of 52D after the permutation and inversion of bits;
   b) . . . with a squared Euclidean distance of 52D are mapped to symbols with a squared Euclidean distance of 8D after the permutation and inversion of bits;
   c) . . . with a squared Euclidean distance of 20D are mapped to symbols with a squared Euclidean distance of 40D after the permutation and inversion of bits;
   d) . . . and a squared Euclidean distance of 40D are mapped to symbols with a squared Euclidean distance of 20D after the permutation and inversion of bits.
4. Two quadruples of bits that have a Hamming distance of 4 and are mapped in their original version to modulation symbols . . .
   a) . . . with a squared Euclidean distance of 8D are mapped to symbols with a squared Euclidean distance of 72D after the permutation and inversion of bits;
   b) . . . with a squared Euclidean distance of 72D are mapped to symbols with a squared Euclidean distance of 8D after the permutation and inversion of bits;
   c) . . . with a squared Euclidean distance of 40D are mapped to symbols with a squared Euclidean distance of 40D after the permutation and inversion of bits.

In one aspect of the present invention, a method is provided for modifying a quadruple of data bits in a data transmission system using Quadrature Amplitude Modulation with 16 different modulation states, 16-QAM, in which a quadruple of data bits is mapped to a modulation symbol according to the logical values and positions of said bits within said quadruple and according to a pre-defined mapping. In the pre-defined mapping of bit value combinations to complex modulation states, four bits in a quadruple of data bits are mapped to a modulation symbol, such that i) a bit on a first one of the four bit positions selects one of two contiguous regions of the 16-QAM modulation states based on its logical value, each of the two contiguous regions being formed by two rows adjacent to each other; ii) a bit on a second one of the four bit positions selects one of two contiguous regions of the 16-QAM modulation states based on its logical value, each of the two contiguous regions being formed by two columns adjacent to each other; iii) a bit on a third one of the four bit positions selects one of two non-contiguous regions of the 16-QAM modulation states based on its logical value, each of the two non-contiguous regions being formed by two rows not adjacent to each other; and iv) a bit on a fourth one of the four bit positions selects one of two non-contiguous regions of the 16-QAM modulation states based on its logical value, each of the two non-contiguous regions being formed by two columns not adjacent to each other. The method comprises the steps of: a) receiving a first quadruple of data bits; b) performing a pre-defined permutation of data bits within the first quadruple of data bits to obtain a second quadruple of data bits, wherein bits from positions in said first quadruple selecting contiguous symbol regions are shifted to positions in said second quadruple selecting non-contiguous symbol regions, and bits from positions in said first quadruple selecting non-contiguous symbol regions are shifted to positions in said second quadruple selecting contiguous symbol regions; and c) mapping data bits from the second quadruple to a modulation symbol according to their position in the quadruple and according to the pre-defined mapping of bit value combinations to complex modulation states.

In another aspect of the present invention, a computer-readable storage medium has stored thereon instructions which when executed on at least one processor of a digital data transmitter system using Quadrature Amplitude Modulation with 16 different modulation states, 16-QAM, cause the transmitter system to carry out the method of the first aspect.

In still another aspect of the present invention, an apparatus is provided for modifying a quadruple of data bits in a data transmission system using Quadrature Amplitude Modulation with 16 different modulation states, 16-QAM, in which a quadruple of data bits is mapped to a modulation symbol according to the logical values and positions of said bits within said quadruple and according to a pre-defined mapping. In the pre-defined mapping of bit value combinations to complex modulation states, four bits in a quadruple of data bits are mapped to a modulation symbol, such that i) a bit on a first one of the four bit positions selects one of two contiguous regions of the 16-QAM modulation states based on its logical value, each of the two contiguous regions being formed by two rows adjacent to each other; ii) a bit on a second one of the four bit positions selects one of two contiguous regions of the 16-QAM modulation states based on its logical value, each of the two contiguous regions being formed by two columns adjacent to each other; iii) a bit on a third one of the four bit positions selects one of two non-contiguous regions of the 16-QAM modulation states based on its logical value, each of the two non-contiguous regions being formed by two rows not adjacent to each other; and iv) a bit on a fourth one of the four bit positions selects one of two non-contiguous regions of the 16-QAM modulation states based on its logical value, each of the two non-contiguous regions being formed by two columns not adjacent to each other. The apparatus comprises: a permutating unit configured to perform a pre-defined permutation of data bits within the first quadruple of data bits to obtain a second quadruple of data bits, wherein bits from positions in said first quadruple selecting contiguous symbol regions are shifted to positions in said second quadruple selecting non-contiguous symbol regions, and bits from positions in said first quadruple selecting non-contiguous symbol regions are shifted to positions in said second quadruple selecting contiguous symbol regions; and a mapper configured to map data bits from the second quadruple to a modulation symbol according to their position in the quadruple and according to the pre-defined mapping of bit value combinations to complex modulation states.

In a further aspect of the present invention, a method is provided for modifying a quadruple of likelihood values for receiving data transmitted using Quadrature Amplitude Modulation with 16 different modulation states, 16-QAM, in which a quadruple of data bits is mapped to a modulation symbol according to the logical values and positions of said bits within said quadruple and according to a pre-defined mapping. In the pre-defined mapping of bit value combinations to complex modulation states, four bits in a quadruple of data bits are mapped to a modulation symbol, such that i) a bit on a first one of the four bit positions selects one of two contiguous regions of the 16-QAM modulation states based on its logical value, each of the two contiguous regions being formed by two rows adjacent to each other; ii) a bit on a second one of the four bit positions selects one of two contiguous regions of the 16-QAM modulation states based on its logical value, each of the two contiguous regions being formed by two columns adjacent to each other; iii) a bit on a third one of the four bit positions selects one of two non-contiguous regions of the 16-QAM modulation states based on its logical value, each of the two non-contiguous regions being formed by two rows not adjacent to each other; and iv) a bit on a fourth one of the four bit positions selects one of two non-contiguous regions of the 16-QAM modulation states based on its logical value, each of the two non-contiguous regions being formed by two columns not adjacent to each other. The method comprises the steps of: a) receiving a second symbol representing a second quadruple of data bits obtained from a first quadruple of data bits by a pre-defined permutation of the data bits within the quadruple, wherein data bits from the second set of quadruples are mapped to modulation symbols according to their position in the quadruple and according to said pre-defined mapping of bit value combinations to complex modulation states; b) determining a second quadruple of likelihood values from the received second symbol, wherein each likelihood value in the second quadruple of likelihood values corresponds to the bit having the same position in the second quadruple of data bits; and c) performing a pre-defined permutation of the likelihood values within the second quadruple of likelihood values to obtain a third quadruple of likelihood values, wherein likelihood values from positions corresponding to bits of the second quadruple of bits selecting a contiguous region of complex modulation states are shifted to positions corresponding to bits of the second quadruple selecting a non-contiguous region of complex modulation states, and likelihood values from positions corresponding to bits of the second quadruple of bits selecting a non-contiguous region of complex modulation states, are shifted to positions corresponding to bits of the second quadruple selecting a contiguous region of complex modulation states.

In still another aspect of the present invention, a computer-readable storage medium has stored thereon instructions which when executed on at least one processor of a digital data receiver system for reception of digital data, transmitted using Quadrature Amplitude Modulation with 16 different modulation states, 16-QAM, cause the receiver system to carry out the method of the preceding aspect.

In still a further aspect of the present invention, a digital receiver system is provided for reception of digital data transmitted using Quadrature Amplitude Modulation with 16 different modulation states, 16-QAM. The digital receiver system comprises: a) receiving means for receiving a second symbol representing a second quadruple of data bits obtained from a first quadruple of data bits by a pre-defined permutation of the data bits within the quadruple, wherein data bits from the quadruples of bits are mapped to modulation symbols according to their position in the quadruple and according to a pre-defined mapping of bit value combinations to complex modulation states. In the pre-defined mapping of bit value combinations to complex modulation states, four bits in a quadruple of data bits are mapped to a modulation symbol such that i) a bit on a first one of the four bit positions selects one of two contiguous regions of the 16-QAM modulation states based on its logical value, each of the two contiguous regions being formed by two rows adjacent to each other; ii) a bit on a second one of the four bit positions selects one of two contiguous regions of the 16-QAM modulation states based on its logical value, each of the two contiguous regions being formed by two columns adjacent to each other; iii) a bit on a third one of the four bit positions selects one of two non-contiguous regions of the 16-QAM modulation states based on its logical value, each of the two non-contiguous regions being formed by two rows not adjacent to each other; and iv) a bit on a fourth one of the four bit positions selects one of two non-contiguous regions of the 16-QAM modulation states based on its logical value, each of the two non-contiguous regions being formed by two columns not adjacent to each other. The digital receiver system further comprises b) a likelihood value calculation unit for determining a second quadruple of likelihood values from the received second symbol, wherein each likelihood value in the quadruple of likelihood values corresponds to the bit having the same position in the corresponding quadruple of data bits; and c) a permutating unit with an input to receive the second quadruple of likelihood values, and an output, the permutating unit being configured to perform a pre-defined permutation of the likelihood values within the input quadruple of likelihood values to obtain a third quadruple of likelihood values for output, wherein likelihood values from positions corresponding to bits of the second quadruple of bits selecting a contiguous region of complex modulation states are shifted to positions corresponding to bits of the second quadruple of data bits selecting a non-contiguous region of complex modulation states, and likelihood values from positions corresponding to bits of the second quadruple of bits selecting a non-contiguous region of complex modulation states are shifted to positions corresponding to bits of the second quadruple of data bits selecting a contiguous region of complex modulation states.

BRIEF DESCRIPTION OF THE DRAWINGS

The accompanying drawings are incorporated into and form a part of the specification for the purpose of explaining the principles of the invention. The drawings are not to be understood as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The exemplary embodiments of the present invention will be described with reference to the figure drawings wherein like elements and structures are indicated by like reference numbers.

AICO Mapping

This invention includes the definition of mapping rules of the 16-QAM constellation. For a better understanding of the further elaboration on the properties of the new mapping which will be referred to as "AICO mapping" in this document, the definitions of several terms frequently used herein below are provided first.

The Hamming weight of a symbol composed of binary elements 0 and 1 (alternatively denoted −1 and 1) is the number of non-zero (i.e. 1) elements within a word composed of binary elements. Consequently for any 4-bit word that is mapped onto a 16-QAM symbol, the Hamming weight can be an integer value of 0 (i.e. for the word "0000"), of 1 (e.g. for the word "0010"), of 2 (e.g. for the word "1010"), of 3 (e.g. for the word "1110"), or of 4 (i.e. for the word "1111"). An even Hamming weight value is also denoted an "even Hamming weight parity", an odd Hamming weight value is denoted an "odd Hamming weight parity".

The Hamming distance between two symbols composed of one or more binary digits is the number of digits in which the position-wise comparison of the digit value is different. Consequently the words "0000" and "1111" have a Hamming distance of 4, since all four digits have different values. The words "1000" and "0010" have a Hamming distance of two, since the first and third digit from the left have different values.

Figure 3:
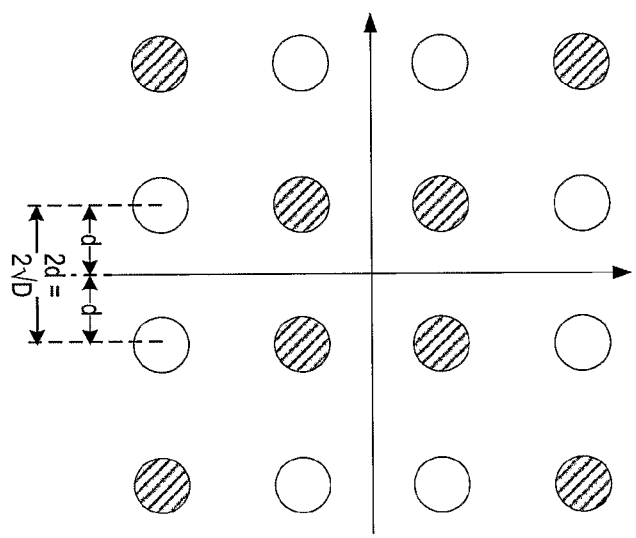
FIG. 3 illustrates Euclidian distances between modulation states.

The proposed AICO mapping fulfils the following properties that are explained with reference to FIG. 3:

a") All words that have a first Hamming weight parity are unambiguously mapped either onto the dashed or the white modulation symbols in FIG. 3.

b") All words that have a second Hamming weight parity are unambiguously mapped either onto the dashed or the white modulation symbols in FIG. 3.

c") The above two properties are complementary to each other, i.e. if the even Hamming weight words are mapped onto the dashed modulation symbols, then the odd Hamming weight words are mapped onto the white modulation symbols.

d") Rotation of a first constellation symbol by 180 degrees shall result in a second constellation symbol that conveys a second word that is the binary complement ("1's complement") of the first word that is conveyed by the first constellation symbol.

Figure 4:
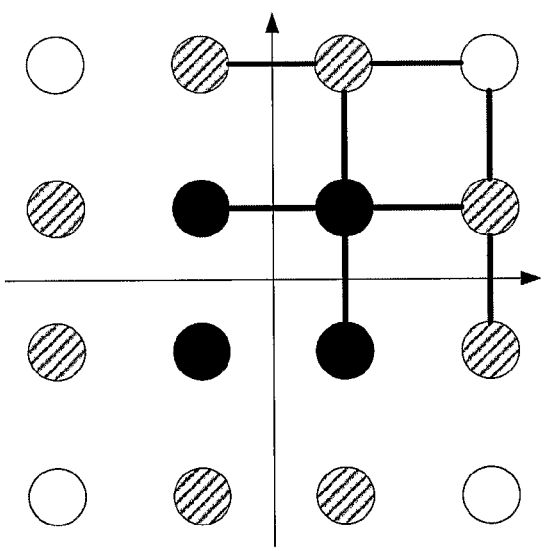
FIG. 4 shows neighbourship relations of 16-QAM modulation states.
Figure 4:
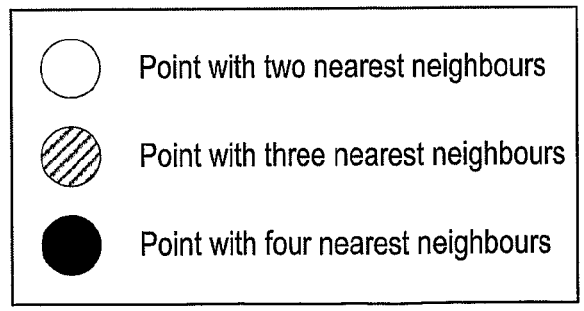

As can be seen in FIG. 4, each symbol in a 16-QAM constellation has two, three or four nearest neighbour symbols. Therefore the first two properties above may be reformulated as follows:

a''') All words that have a first Hamming weight parity are unambiguously mapped either onto modulation symbols with two nearest neighbours or with four nearest neighbours.

b''') All words that have a second Hamming weight parity are unambiguously mapped onto modulation symbols with three nearest neighbours.

A noteworthy consequence of these properties is that the Gray principle for closest neighbouring symbols is violated in some cases. Therefore, this mapping proposed by the invention may also be referred to as a non-Gray mapping. The last property of the AICO mapping rules above means that antipodal constellation symbols carry words that are binary inverted. Therefore this mapping is referred to as Antipodal Inverted Constellation Mapping, or AICO mapping in this document. A consequence of the non-Gray characteristic is the difference of symbol regions selected by specific bits.

FIG. 7 shows exemplary mappings of quadruples of data bits to modulation states in the representation of the 16-QAM constellation in the complex plane, which fulfil the rules given above. FIG. 8 to FIG. 11 show the correspondence of the individual bits of a data word (i.e. a quadruple of data bits) to symbol regions for this mapping example; i.e. the selection of one of the respective symbol regions based on the logical value of a respective bit in the data word. FIG. 8 to FIG. 11 thereby visualize, how an individual bit of a quadruple of data bits mapped to a corresponding modulation symbol selects one of the different symbol regions based on its logical value. Although the invention is explained for the example of this particular mapping, the actual assignment of bit positions within the quadruple to the bit numbers and the assignment of the bit values to the selected regions are not relevant for the properties of the mapping as discussed herein below, as long as the regions have the structure as shown in FIGS. 8 to 11.

Figure 8:
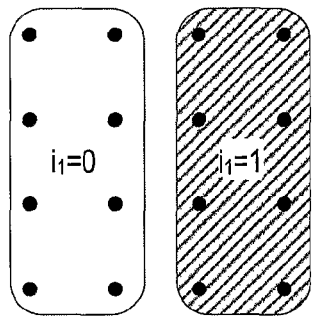
FIGS. 8 to 11 illustrate exemplary regional mappings of the four constituent bits (data word) to their respective symbols in a square 16-QAM constellation using AICO mapping.
Figure 9:
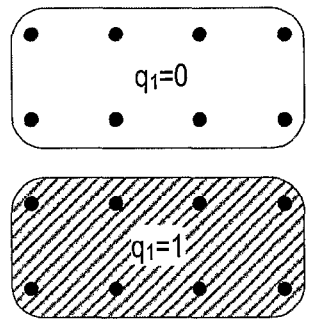

In FIG. 8 an exemplary correspondence of a first data bit of the quadruple of bits to one of two vertical contiguous symbol regions $i_1=0$ and $i_1=1$ is shown. Based on the logical value of the data bit $i_1$, one of the two symbol regions is selected. There exist two contiguous symbol regions, one each for $i_1=0$ and $i_1=1$. Accordingly, FIG. 9 illustrates how a second data bit $q_1$ of the quadruple of bits is mapped to one of two horizontal contiguous symbol regions $q_1=0$ and $q_1=1$. Hence, two bits $i_1$, $q_1$ of the quadruple of bits (data word) are selecting contiguous symbol regions in the representation of the 16-QAM constellation in the complex plane.

Figure 10:
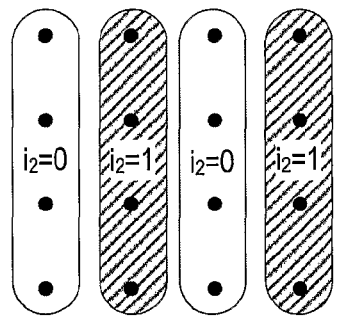
Figure 11:
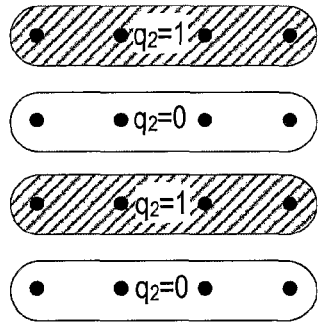
Figure 12:
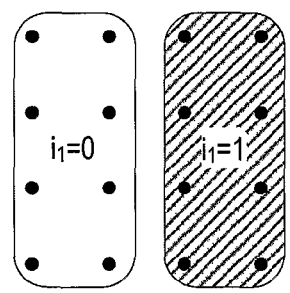
FIGS. 12 to 15 show the regional mappings of the four constituent bits (data word) to their symbols in a square 16-QAM constellation using Gray mapping.
Figure 13:
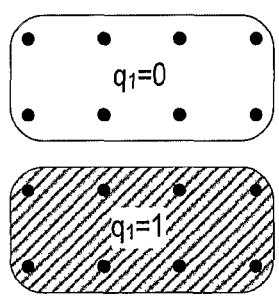
Figure 14:
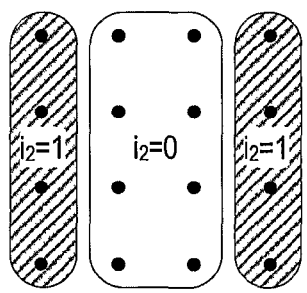
Figure 15:
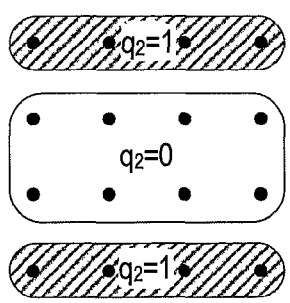

Further, FIG. 10 shows an exemplary selection of one of two vertical non-contiguous symbol regions $i_2=0$ and $i_2=1$ by a third data bit $i_2$ of the quadruple of bits, and FIG. 11 shows an exemplary selection of one of two horizontal non-contiguous symbol regions $q_2=0$ and $q_2=1$ by a fourth data bit $q_2$ of the quadruple of bits. The remaining two bits $i_2$, $q_2$ of the quadruple of bits (data word) are thus selecting non-contiguous symbol regions in the representation of the 16-QAM constellation in the complex plane.

In FIG. 8 to FIG. 11 it is not required that the "first data bit" selecting one of the two contiguous symbol regions $i_1=0$ and $i_1=1$ in FIG. 8 is equivalent to the most significant bit of the data word. Likewise the "second, third and fourth data bit" do not necessarily have to correspond to the second, third or fourth bit of the data word, respectively. Similarly, the exemplary selection of the symbol regions in FIG. 8 to FIG. 11 may also not be construed as to be limited to the two most significant bits of the data word selecting a respective one of the contiguous symbol regions illustrated in FIG. 8 and FIG. 9, while the two least significant bits of the data word select a respective one of the two non-contiguous symbol regions shown in FIG. 10 and FIG. 11, though this implementation is certainly possible.

To understand the difference of this proposed AICO mapping scheme to a conventional Gray mapping scheme, the equivalent corresponding symbol regions for a Gray approach are given in FIG. 12 to FIG. 15. It is recognized from FIG. 12 to FIG. 15 that for two out of the four bits of a data word there is no difference in the symbol regions between the Gray and AICO mappings. However for the two remaining bits the symbol regions are different. Depending on the logical bit value, either a modulation symbol from a contiguous or non-contiguous region is used in Gray mapping, but in AICO mapping always a modulation symbol from two non-contiguous regions is used.

In Chindapol et al., "Design, analysis, and performance evaluation for BICM-ID with square QAM constellations in Rayleigh fading channels", discussed herein above, Gray and other mappings, including their respective region mappings are presented. It may be noted that the constellations presented in the article of Chindapol et al. are intended for use in an iterative decoding scheme presented in the article. In contrast thereto, the invention does not require an iterative structure at the receiver and therefore allows the use of simple hardware in transmitter and receiver.

As can be seen in from FIG. 8 to FIG. 11, the modulation symbols are arranged in 4 columns of four modulation symbols each, when considering a vertical separation of the modulation symbols, and in four rows of modulation symbols each, when considering a horizontal separation of the modulation symbols. Based on this exemplary illustration of the 16-QAM constellation shown in FIG. 8 to FIG. 11, the mapping outlined in a") to d") above may alternatively be formulated as:

a) a first one of the four data bits representing a modulation symbol selects one of two contiguous symbol regions of the 16-QAM constellation based on its logical value, each of the two contiguous symbol regions being formed by two rows adjacent to each other;

b) a second one of the four data bits representing the respective modulation symbol selects one of two contiguous symbol regions of the 16-QAM constellation based on its logical value, each of the two contiguous symbol regions being formed by two columns adjacent to each other;

c) a third one of the four data bits representing the respective modulation symbol selects one of two non-contiguous symbol regions of the 16-QAM constellation based on its logical value, each of the two non-contiguous symbol regions being formed by two rows not adjacent to each other; and d) a fourth one of the four data bits representing the respective modulation symbol selects one of two non-contiguous symbol regions of the 16-QAM constellation based on its logical value, each of the two non-contiguous symbol regions being formed by two columns not adjacent to each other.

As has been briefly explained above, a transmit diversity structure for Gray mapping, e.g. in the time domain (ARQ, HARQ), has benefits if the at least second version of the 16-QAM constellation is rearranged for diversity transmission in the signal space with respect to the first version. Another main aspect of the invention is a definition of constellation rearrangement rules for use in transmit diversity scenarios with the above specified AICO mapping.

As has been mentioned earlier, each point in a 16-QAM constellation has either two, three, or four nearest neighbour points (see FIG. 4, exemplified for the symbols in the northeast quadrant by the lines connecting the symbols).

In the following, d denotes the minimum Euclidian distance between a modulation symbol in the 16-QAM constellation and one of the axes defining the in-phase and the quadrature components of the modulation symbols, as illustrated in FIG. 3. Accordingly, D denotes the squared minimum Euclidian distance, i.e. $d^2=D$. Consequently, the minimum squared Euclidian distance between two modulation symbols is $(2d)^2$ or 4D. If it is assumed that the first constellation version adheres to the definitions of AICO mapping above, the following properties with respect to the involved Hamming distances and (squared) Euclidean distances may be observed.

Figure 5:
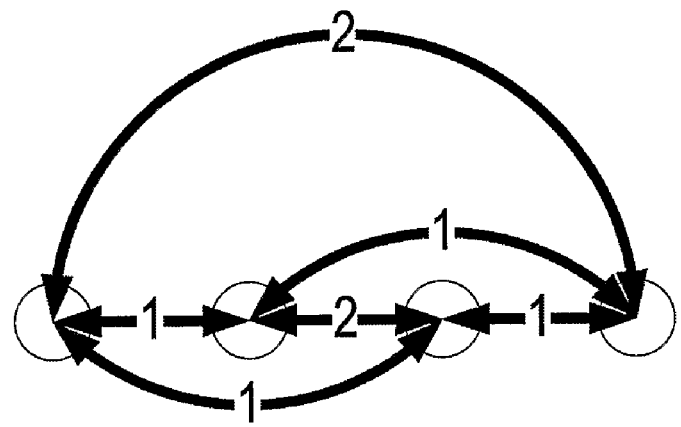
FIGS. 5 and 6 show the occurrence of Hamming and squared Euclidean distances between constellation symbols in one dimension of a 16-QAM constellation employing the AICO mapping principle.
Figure 6:
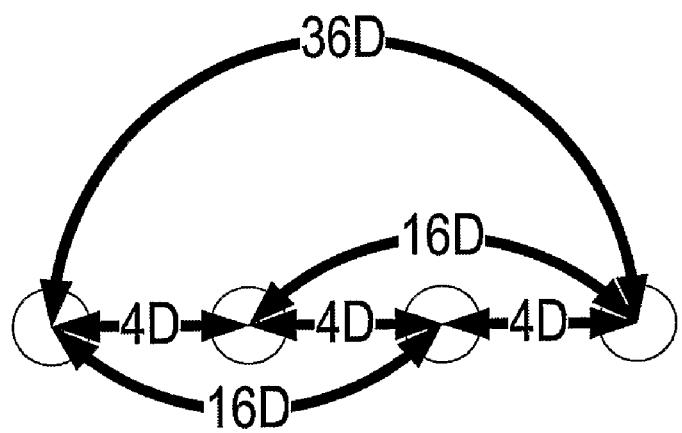

FIGS. 5 and 6 show the Hamming distances and squared Euclidean distances regarding one dimension of an AICO mapping, i.e. the Hamming distances and squared Euclidean distances of modulations symbols in each row or column of the two dimensional, complex signal space. Those skilled in the art will appreciate that this is done for simplicity. These distance properties can easily be extended to the two-dimensional 16-QAM case by adding the Hamming and squared Euclidean distances for each dimension respectively. In FIGS. 5 and 6 the variable D is used for normalisation purposes. Usually if a 16-QAM constellation is employed, the distances between symbols of the constellation are normalized so that the average power is equal to 1. Therefore, in this exemplary embodiment, D would be equal to 1/10.

The table below shows the distance profiles for a single version Gray and AICO mapping (including a distance of zero for the trivial case of the distance between a symbol and itself).

| Hamming Distance | Gray Mapping: Frequency × Squared Euclidean Distance | AICO Mapping: Frequency × Squared Euclidean Distance |
|---|---|---|
| 0 | 16 × 0D | 16 × 0D |
| 1 | 48 × 4D, 16 × 36D | 32 × 4D, 32 × 16D |
| 2 | 36 × 8D, 32 × 16D, 24 × 40D, 4 × 72D | 16 × 4D, 16 × 8D, 32 × 20D, 16 × 32D, 16 × 36D |
| 3 | 48 × 20D, 16 × 52D | 16 × 8D, 16 × 20D, 16 × 40D, 16 × 52D |
| 4 | 16 × 32D | 4 × 8D, 8 × 40D, 4 × 72D |

The frequency of occurrence of the squared Euclidean distance(s) for a pair of symbols having a particular Hamming distance is counted and summed up for all symbols of the 16-QAM constellation. Therefore the case of Hamming distance zero occurs 16 times, as there are 16 distinct symbols in a 16-QAM constellation.

Constellation Rearrangement

When employing the constellation rearrangement scheme for Gray Mapping (as introduced in the beginning of the present application) to transmit two versions, distances from both versions are combined for each pair of symbols. For example, in the table above it can be recognized that two symbols with a Hamming distance of 1 may have a Squared Euclidean Distance of either 4D or 36D for Gray Mapping. Since both versions employ Gray mapping, this is true for the first and the second version, therefore a combined distance of either 8D (=4D+4D), 40D (=4D+36D=36D+4D), or 72D (=36D+36D) is possible. However, closer inspection of the constellation rearrangement concept for Gray mapping reveals that only the combined distances of either 8D or 40D are possible using two versions. Overall, a combining of distances from both versions for all pairs of symbols results in the distance properties given in the table below.

| Hamming Distance | Gray Mapping Frequency × Squared Euclidean Distance |
| --- | --- |
| 0 | 16 × 0D |
| 1 | 32 × 8D, 32 × 40D |
| 2 | 16 × 16D, 32 × 32D, 32 × 48D, 16 × 80D |
| 3 | 32 × 40D, 32 × 72D |
| 4 | 16 × 64D |

From the table above it can be recognized that after using the constellation rearrangement scheme for Gray mapping there is no unambiguous distribution of the distances, since for a given Hamming Distance there may be several resulting Squared Euclidean Distances. However when using AICO mapping, as will be illustrated below, an unambiguous distribution of the distances is possible when combining two versions of AICO constellations using the following set of constellation rearrangement rules:

1. Two modulation symbols that have a Hamming distance of 1 . . .
   a) . . . and a squared Euclidean distance of 4D in the first version have a squared Euclidean distance of 16D in the second version;
   b) . . . and a squared Euclidean distance of 16D in the first version have a squared Euclidean distance of 4D in the second version.
2. Two modulation symbols that have a Hamming distance of 2 . . .
   a) . . . and a squared Euclidean distance of 4D in the first version have a squared Euclidean distance of 36D in the second version;
   b) . . . and a squared Euclidean distance of 36D in the first version have a squared Euclidean distance of 4D in the second version;
   c) . . . and a squared Euclidean distance of 8D in the first version have a squared Euclidean distance of 32D in the second version;
   d) . . . and a squared Euclidean distance of 32D in the first version have a squared Euclidean distance of 8D in the second version;
   e) . . . and a squared Euclidean distance of 20D in the first version have a squared Euclidean distance of 20D in the second version.
3. Two modulation symbols that have a Hamming distance of 3 . . .
   a) . . . and a squared Euclidean distance of 8D in the first version have a squared Euclidean distance of 52D in the second version;
   b) . . . and a squared Euclidean distance of 52D in the first version have a squared Euclidean distance of 8D in the second version;
   c) . . . and a squared Euclidean distance of 20D in the first version have a squared Euclidean distance of 40D in the second version;
   d) . . . and a squared Euclidean distance of 40D in the first version have a squared Euclidean distance of 20D in the second version.
4. Two modulation symbols that have a Hamming distance of 4 . . .
   a) . . . and a squared Euclidean distance of 8D in the first version have a squared Euclidean distance of 72D in the second version;
   b) . . . and a squared Euclidean distance of 72D in the first version have a squared Euclidean distance of 8D in the second version;
   c) . . . and a squared Euclidean distance of 40D in the first version have a squared Euclidean distance of 40D in the second version.

In this document, two versions of AICO (or Gray) mappings that relate to each other according to the above rules will be referred to as AICO (or Gray) diversity arrangement mappings or versions. The graphical representation of how the symbols are rearranged according to the above rules in the diversity arrangement versions will be referred to as "rearrangement patterns".

A rearrangement following these rules has the following properties:

1. A modulation symbol of the 16-QAM constellation that has two nearest neighbors in the first version is rearranged such that it has four nearest neighbors in the second version.
2. A modulation symbol of the 16-QAM constellation that has three nearest neighbors in the first version is rearranged such that it has three nearest neighbors in the second version.
3. A modulation symbol of the 16-QAM constellation that has four nearest neighbors in the first version is rearranged such that it has two nearest neighbors in the second version.
4. A modulation symbol with two nearest neighbours and a modulation symbol with four nearest neighbours, which are situated in the same quadrant of the complex symbol constellation in the first version, are situated in opposite quadrants in the second version.

Figure 17:
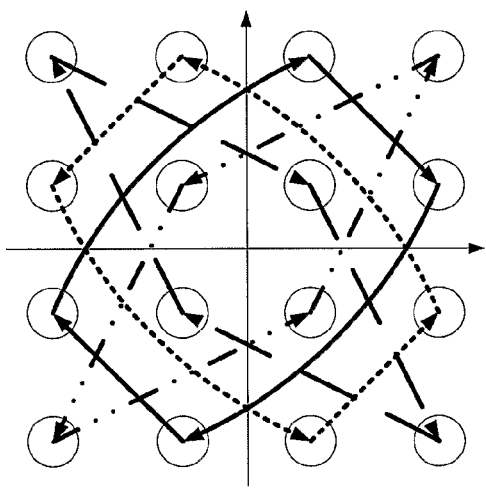
FIGS. 17 to 24 show the eight rearrangement relations fulfilling the specified rearrangement rules.
Figure 18:
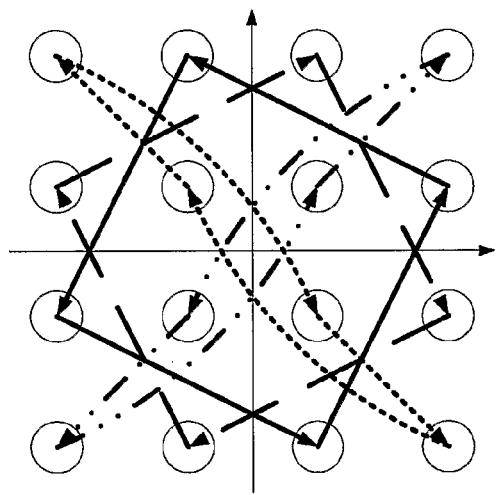
Figure 19:
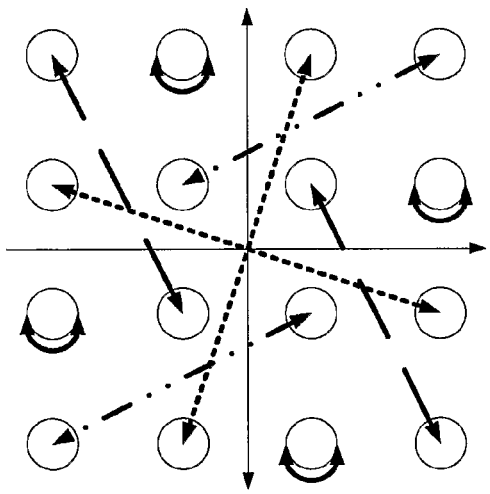
Figure 20:
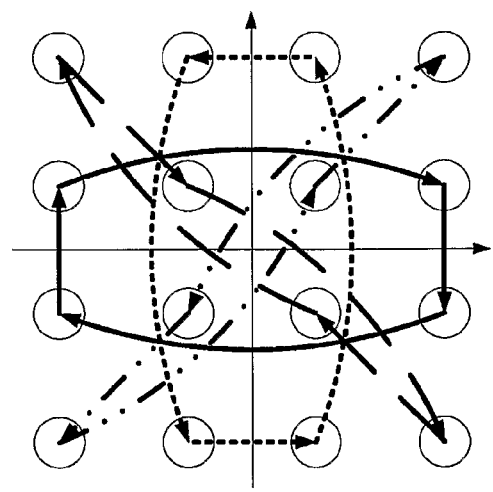
Figure 21:
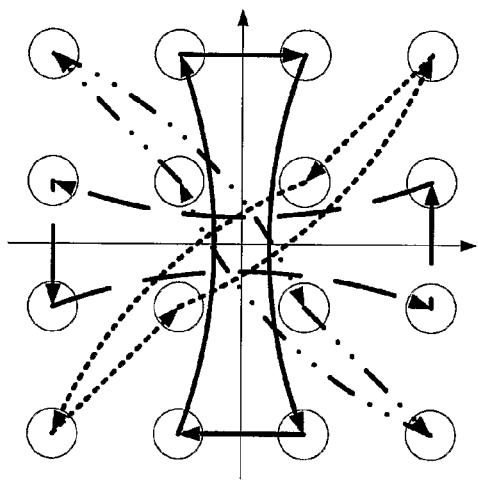
Figure 22:
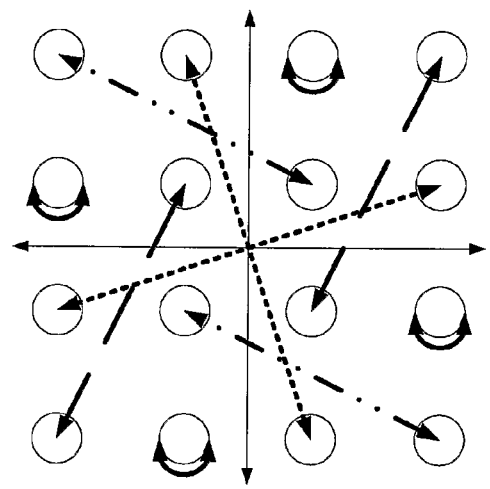
Figure 23:
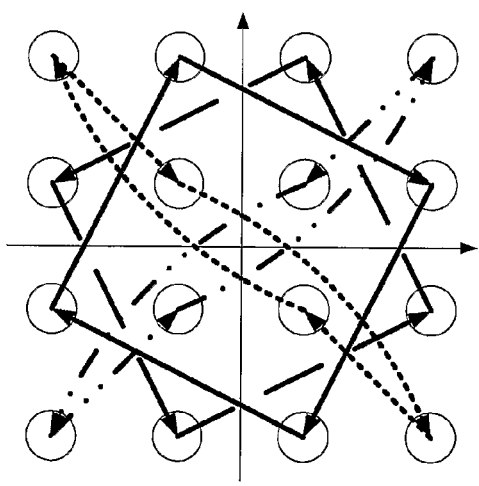
Figure 24:
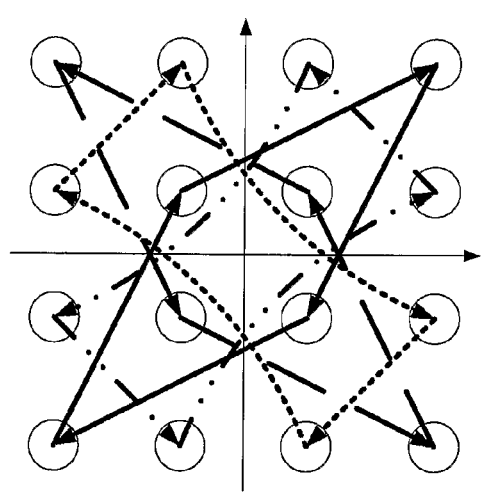

An exemplary rearrangement pattern may be such that two signal points exchange their positions between first and second version, as for example shown in FIG. 19. In FIG. 19 four modulation symbols keep their positions in the rearranged constellation, i.e. exchange their positions with themselves. Alternatively, the rearrangement pattern may be directional as shown in FIG. 17.

When using two diversity arrangement versions of AICO 16-QAM constellations for the first and the second transmission adhering to the rearrangement rules defined above, it can be noted that due to the antipodal property of the constellations, the rearrangement patterns are symmetric to the origin.

From the set of rearrangement rules above, eight different possible rearrangement patterns have been found by computer-aided search. These patterns are given in FIG. 17 to FIG. 24. In FIG. 17 to FIG. 24, the arrows indicate which symbol of the AICO 16-QAM constellation is transmitted in the second, rearranged version if the symbol at the origin of the respective arrow is transmitted for the same original data word in the first version of the AICO 16-QAM constellation. Each of these eight exemplary solutions fulfils the requirements on the rearrangement properties defined above. From a performance point of view, these eight solutions are therefore equivalent.

The result of combining the distances of two diversity arrangement versions for two Gray versions and for two AICO versions are summarized in the table below.

| Hamming Distance | Gray Mapping Frequency × Squared Euclidean Distance | AICO Mapping Frequency × Squared Euclidean Distance |
| --- | --- | --- |
| 0 | 16 × 0D | 16 × 0D |
| 1 | 32 × 8D, 32 × 40D | 64 × 20D |
| 2 | 16 × 16D, 32 × 32D, 32 × 48D, 16 × 80D | 96 × 40D |
| 3 | 32 × 40D, 32 × 72D | 64 × 60D |
| 4 | 16 × 64D | 16 × 80D |

The table above illustrates the frequency of occurrence of the squared Euclidean distance(s) for a pair of symbols having a particular Hamming distance in the first and second constellation versions, counted and summed up for all points of the 16-QAM constellation.

Figure 16:
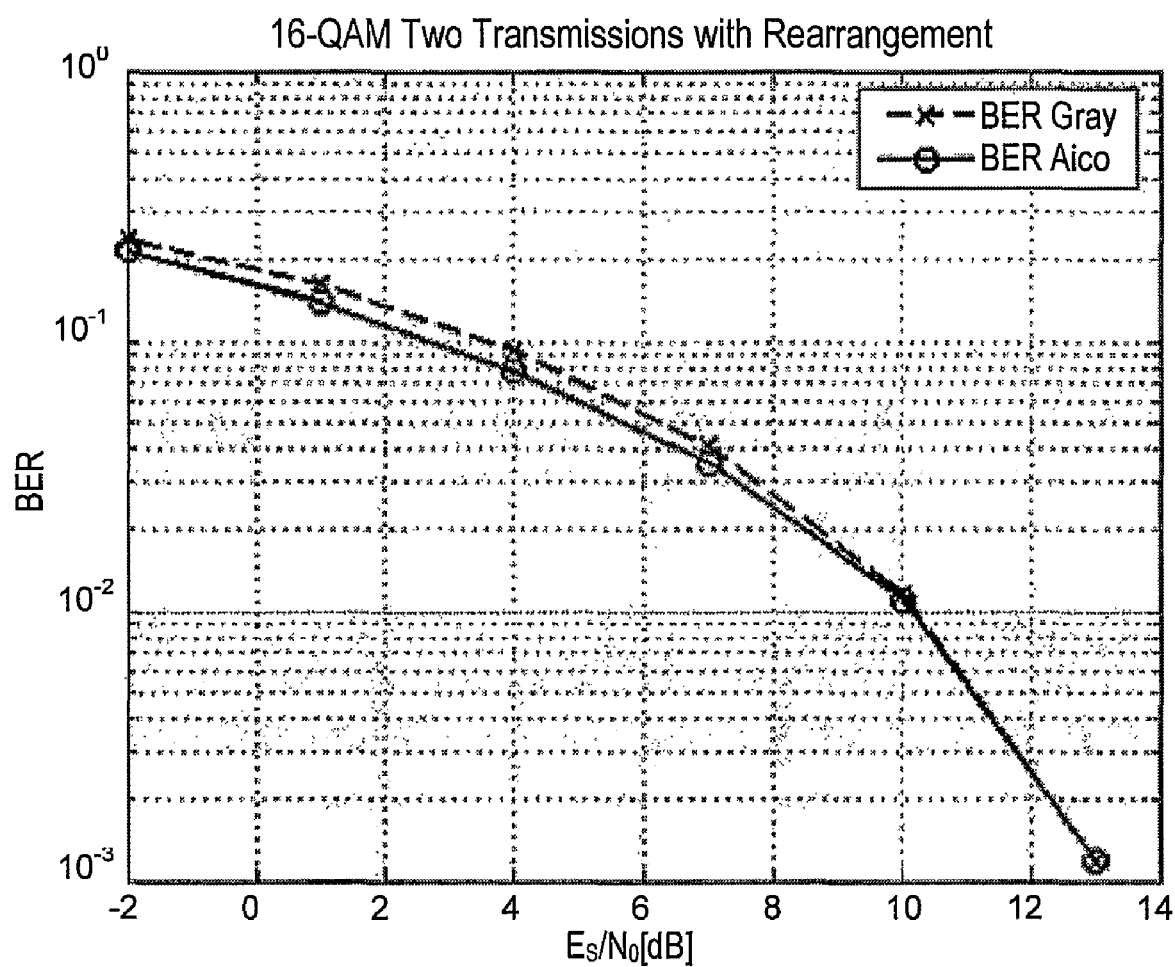
FIG. 16 shows the Monte Carlo simulation result in AWGN for Gray and AICO 16-QAM mapping for an uncoded transmission using one original and one rearranged mapping version.

The merit of the proposed structure has been proven by numerical Monte Carlo simulations. The simulation result shown in FIG. 16 illustrates a comparison of the bit-error rate performance for an uncoded signal in an Additive White Gaussian Noise (AWGN) environment using Gray mapping and AICO mapping when employing two transmissions of a data word with different constellations, respectively. The results shown in this figure have been obtained by a very simple single-stage LLR-calculator for each bit of a modulation symbol, and subsequent combining of the LLRs for the corresponding bits in diversity transmission/reception, followed by a hard decision depending on the sign of the resultant combined LLR.

Example distance statistics for a diversity transmission employing four Gray constellation mappings and four AICO constellation versions as described above are shown in the table below.

| Hamming Distance | Gray Mapping Frequency × Squared Euclidean Distance | AICO Mapping Frequency × Squared Euclidean Distance |
| --- | --- | --- |
| 0 | 16 × 0D | 16 × 0D |
| 1 | 64 × 48D | 64 × 40D |
| 2 | 32 × 64D, 64 × 96D | 96 × 80D |
| 3 | 64 × 112D | 64 × 120D |
| 4 | 16 × 128D | 16 × 160D |

In the different distance property tables illustrated in this document, the frequencies of how often certain squared Euclidean distances occur for different Hamming distances between two modulation symbols, have been listed. For those, the differences of all signal points to all signal points are evaluated. Consequently there exist a total of 16×16=256 distance values, which is obtained also by summing all listed frequencies. Since Hamming distance and squared Euclidean distance between a point and itself are both 0, and having a total of 16 distinct modulation symbols within the constellation, the value Euclidean distance and Hamming distance of 0 is obtained exactly 16 times. Similarly the sum of frequencies is always 64 for a Hamming distance of 1, is always 96 for a Hamming distance of 2, is always 64 for a Hamming distance of 3, and is always 16 for a Hamming distance of 4.

Bit Rearrangement

Figure 25:
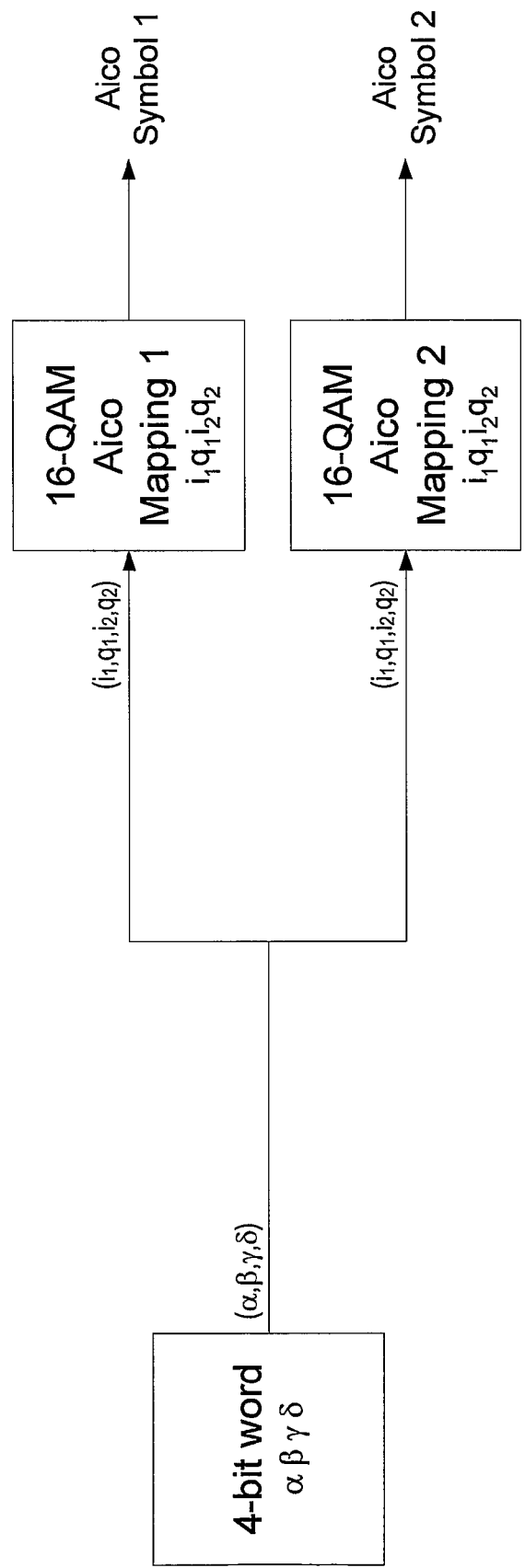
FIG. 25 shows an exemplary block diagram of a transmission apparatus structure for transmission antenna diversity employing two branches.

In a system as for example in FIG. 25, a diversity rearrangement effect can be achieved by employing different mapping rules between four bits and the corresponding complex number that represents a modulation symbol. Assuming that the complex number s is represented by a form $$s = x + jy \quad (1)$$

where j is the imaginary unit (square root of −1), x forms the real part and y is the imaginary part, the mapping units provide a relation between the four bits ($i_1$ $q_1$ $i_2$ $q_2$) and the complex symbol s. The bits ($i_1$ $q_1$ $i_2$ $q_2$) shall be referred to as "quadruple of bits input to the mapping unit".

As can be seen in the figure, the relation between the source bits ($\alpha\beta\gamma\delta$) and the quadruple of bits input to the mapping unit is identical, and therefore the input bits ($i_1$ $q_1$ $i_2$ $q_2$) are identical in the mapping units. In order to achieve the rearrangement diversity effect, the relations between input bits and output complex symbols have to be different. In order to achieve a diversity rearrangement effect without implementing two different mapping units, the present invention proposes to modify the relation between source bits and bits input to the mapping unit. In other words, the bits are rearranged, or permutated, within the quadruple of bits before the mapping. This solution is seen exemplary in FIG. 27: The source bits pass along two branches, where they are modified in the second branch by a permutating unit 2701. Subsequently the words are multiplexed by selector 2702 into the mapper/modulator 2703, which effectively produces two symbols for each four-bit source word leaving the source. The output of mapper/modulator may be a baseband signal which is input to transmission means 2704. A word repeater 2705 may be employed to duplicate the quadruple of bits for mapping to the two transmitted symbols. Synchronicity between word repeater 2705 and selector 2702 may be obtained by a control unit 2706.

Figure 28:
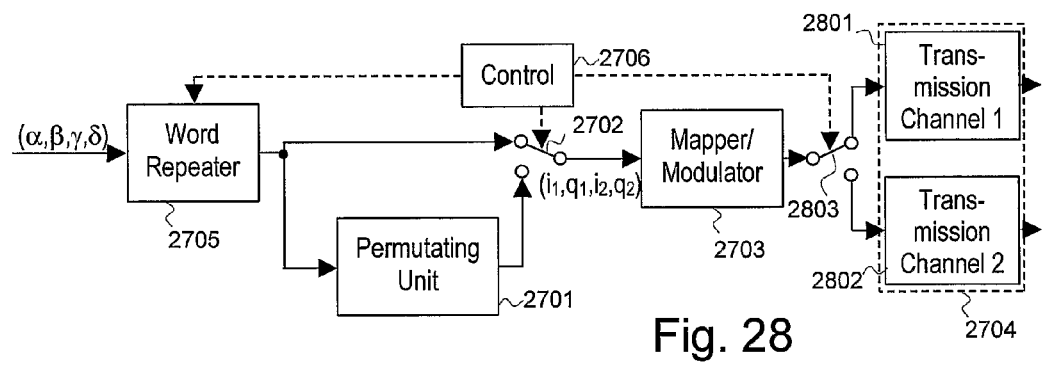

The two obtained transmission symbols may be de-multiplexed by a de-multiplexer 2803 into two transmission channels 2801 and 2802 like shown in FIG. 28, e.g. two distinct antenna branches, resulting in the AICO rearrangement diversity effect that may be exploited by a suitable receiver. Alternatively, a mapper 2903 may have two inputs and two outputs for simultaneous mapping of both quadruples of data bits to transmission symbols (according to the same mapping), like shown in FIG. 29. If both symbols are transmitted from separate locations (not shown), one transmitter may transmit the first symbol and send the first quadruple of data bits to the second transmitter which performs the permutation and, if applicable, bit inversion to obtain the second quadruple of data bits, and maps the second quadruple of data bits to a second symbol which is then transmitted. In this case, two separate mappers may be used.

The relation between source bits and bits input to the mapping unit is modified in the second branch by the operation of the permutating unit, which will subsequently be explained in further detail.

Figure 7A:
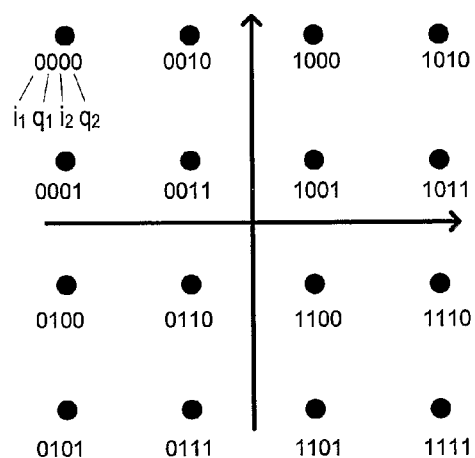
FIG. 7 shows four examples of mapping words to constellation points employing the AICO mapping principle.

When defining the required properties of the permutating unit, it has to be observed that there are two types of AICO mappings from quadruples of bits to modulation symbols. The mappings of FIGS. 7a and 7b have a certain symmetry between columns and rows. Both outer columns are associated with bit value combinations in which both bits selecting columns have the same value. For example, in FIG. 7a, both $i_1$ and $i_2$ are zero for the outer left column, and both $i_1$ and $i_2$ are one for the outer right column. In an analogous way, both outer rows are associated with bit value combinations in which both bits selecting rows have the same value. In FIG. 7a, both $q_1$ and $q_2$ are zero for the top row, and both $q_1$ and $q_2$ are one for the lowest row.

Figure 7B:
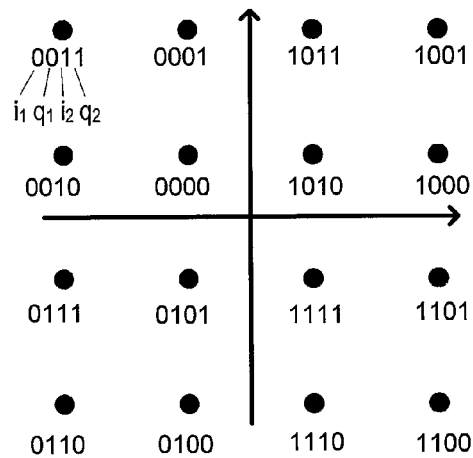

A mapping in which both bits selecting columns have different values for the outer columns and both bits selecting rows have different values for the outer rows, like shown in FIG. 7b, also has this symmetric property.

Figure 7C:
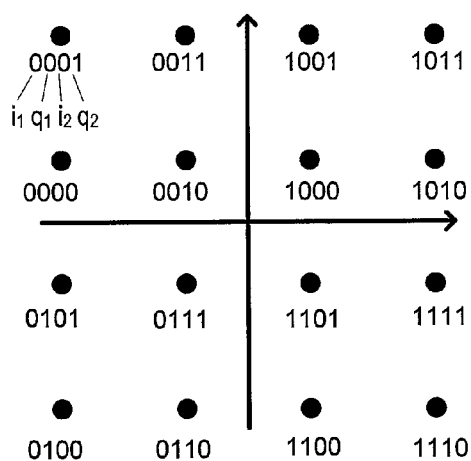
Figure 7D:
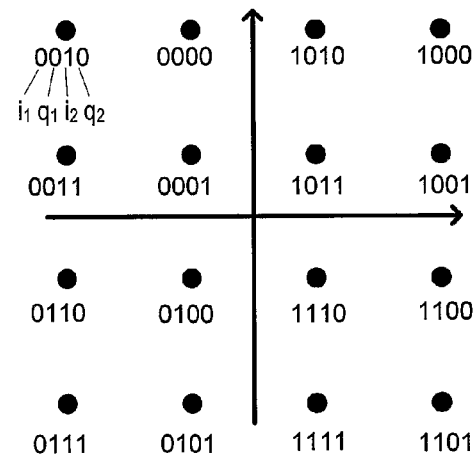

Conversely, a mapping in which both bits selecting columns have the same value for the outer columns and both bits selecting rows have different values for the outer rows would lack this symmetric property, as well as a mapping in which both bits selecting columns have different values for the outer columns and both bits selecting rows have the same value for the outer rows. Examples of such AICO mappings are shown in FIGS. 7c and 7d.

The operations required will now be disclosed with reference to the FIGS. 8-11. In these Figures, the regions are highlighted which are selected by a given bit of the quadruple, depending on its logical value. We can observe that two bits select contiguous regions (FIG. 8, FIG. 9), and two bits select non-contiguous regions (FIG. 10, FIG. 11). Due to the nature of the regions in FIG. 8 and FIG. 10, the corresponding bits $i_1$, $i_2$ are called "in-phase bits", and the corresponding bits $q_1$, $q_2$ for the regions in FIG. 9 and FIG. 11 are called "co-phase bits". Obviously for each symbol there exist two in-phase and two co-phase bits.

To achieve the rearrangement specified above and in FIG. 17-24, a bit which is transmitted in a first transmission on a position in which it selects between contiguous regions has to be shifted for a second transmission to a position in which it selects between non-contiguous regions, and vice versa. In addition, bits selecting rows may optionally be swapped with bits selecting columns and vice versa.

Additionally a subset of the quadruple of bits may have to be inverted. The rules for the inversion depend on whether the mapping shows the symmetric property between rows and columns as described above. The reason for this is that in the asymmetric case a swapping between bits selecting rows and bits selecting columns inherently has an additional bit inversion effect equivalent to the inversion of one bit selecting columns and one bit selecting rows.

In the symmetric case (e.g. mapping of FIG. 7a or 7b) exactly one in-phase bit and one co-phase bit have to be inverted. This inversion may be effected before the permutation or after the permutation. Both alternatives yield the same set of rearrangements. The bit inversion swaps outer columns/rows with inner columns/rows thereby swapping symbols having four nearest neighbours with symbols having two nearest neighbours. The permutation between bits selecting contiguous regions and bits selecting non-contiguous regions either swaps both inner columns/rows with each other or both outer columns/rows with each other, depending on the particular mapping. The effect of this swapping is that a pair of symbols which are in the same quadrant of the complex constellation of modulation states for the first version, is mapped to opposite quadrants in the respective rearranged version, if either both symbols have three nearest neighbours or one has two nearest neighbours and the other one has four.

In the asymmetric case (FIG. 7c or 7d), exactly one in-phase bit and one co-phase bit have to be inverted if the permutation does not swap bits selecting rows with bits selecting columns, i.e. if both bits selecting rows in the first quadruple are shifted to positions selecting rows in the second quadruple and both bits selecting columns in the first quadruple are shifted to positions selecting columns in the second quadruple. If bits selecting rows are swapped with bits selecting columns, i.e. both bits selecting rows are shifted to positions selecting columns and both bits selecting columns are shifted to positions selecting rows, then additional bit inversion is not mandatory. However, if bits are inverted, both bits selecting columns or both bits selecting rows or all bits have to be inverted at the same time.

Without loss of generality it is assumed below that for the first version the following source bits $\alpha$, $\beta$, $\gamma$, $\delta$ correspond to the following bits $i_1$, $q_1$, $i_2$, $q_2$ at the input of the mapper:

$$\alpha \leftrightarrow i_1$$

$$\beta \leftrightarrow q_1$$

$$\gamma \leftrightarrow i_2$$

$$\delta \leftrightarrow q_2$$

Then the four tables below show possible correspondences for the symmetric and for the asymmetric case.

Figure 26:
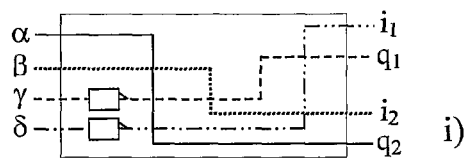
FIG. 26 shows the internal structure of permutating units.
Figure 26:
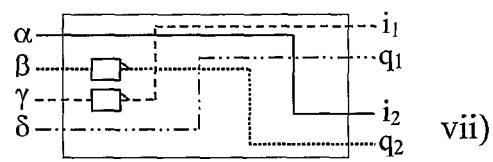
Figure 26:
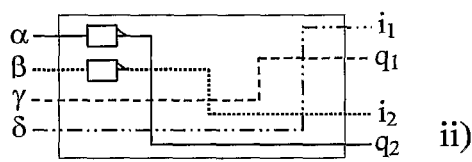
Figure 26:
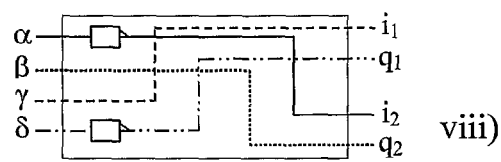
Figure 26:
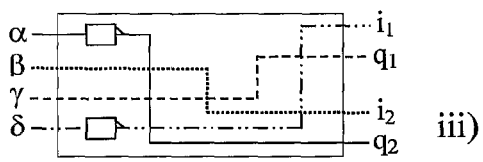
Figure 26:
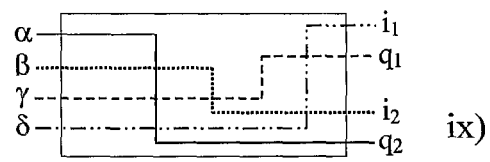
Figure 26:
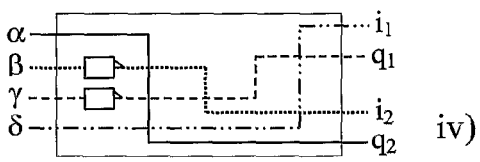
Figure 26:
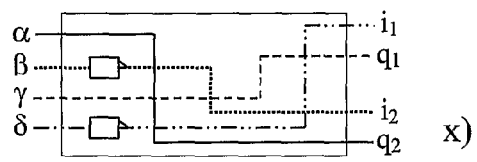
Figure 26:
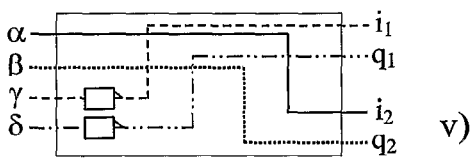
Figure 26:
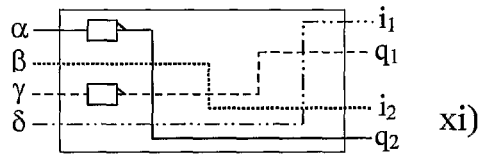
Figure 26:
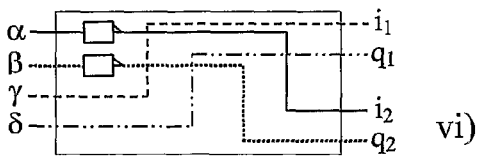
Figure 26:
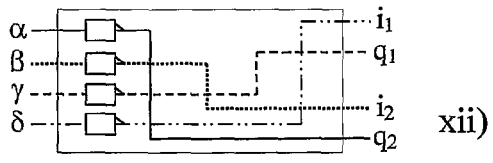

There are degrees of freedom as far as which bits are inverted, and whether in-phase bits of the first version are also in-phase bits in the second version or not. Consequently there exist several solutions to the problem, which are equivalent from their properties as far as the achievement of the diversity rearrangement effect is concerned. For the sake of completeness the complete set of solutions is graphically represented in FIG. 26. The corresponding relations for a symmetric mapping where the bits selecting outer rows have the same values and the bits selecting outer columns have the same values like e.g. in FIG. 7a are the following:

| Reagrrangement and inversion | | Number | FIG. |
|---|---|---|---|
| $i_1 q_1 i_2 q_2 \leftrightarrow \begin{cases} \alpha\beta\gamma\delta & 1^{st}\text{ version} \\ \overline{\delta}\overline{\gamma}\beta\alpha & 2^{nd}\text{ version} \end{cases}$ | | i) | 21 |
| $i_1 q_1 i_2 q_2 \leftrightarrow \begin{cases} \alpha\beta\gamma\delta & 1^{st}\text{ version} \\ \delta\gamma\overline{\beta}\overline{\alpha} & 2^{nd}\text{ version} \end{cases}$ | | ii) | 20 |
| $i_1 q_1 i_2 q_2 \leftrightarrow \begin{cases} \alpha\beta\gamma\delta & 1^{st}\text{ version} \\ \overline{\delta}\gamma\beta\overline{\alpha} & 2^{nd}\text{ version} \end{cases}$ | | iii) | 22 |
| $i_1 q_1 i_2 q_2 \leftrightarrow \begin{cases} \alpha\beta\gamma\delta & 1^{st}\text{ version} \\ \delta\overline{\gamma}\overline{\beta}\alpha & 2^{nd}\text{ version} \end{cases}$ | | iv) | 19 |
| $i_1 q_1 i_2 q_2 \leftrightarrow \begin{cases} \alpha\beta\gamma\delta & 1^{st}\text{ version} \\ \overline{\gamma}\overline{\delta}\alpha\beta & 2^{nd}\text{ version} \end{cases}$ | | v) | 18 |
| $i_1 q_1 i_2 q_2 \leftrightarrow \begin{cases} \alpha\beta\gamma\delta & 1^{st}\text{ version} \\ \gamma\delta\overline{\alpha}\overline{\beta} & 2^{nd}\text{ version} \end{cases}$ | | vi) | 23 |
| $i_1 q_1 i_2 q_2 \leftrightarrow \begin{cases} \alpha\beta\gamma\delta & 1^{st}\text{ version} \\ \overline{\gamma}\delta\alpha\overline{\beta} & 2^{nd}\text{ version} \end{cases}$ | | vii) | 17 |
| $i_1 q_1 i_2 q_2 \leftrightarrow \begin{cases} \alpha\beta\gamma\delta & 1^{st}\text{ version} \\ \gamma\overline{\delta}\overline{\alpha}\beta & 2^{nd}\text{ version} \end{cases}$ | | viii) | 24 |

The corresponding relations for a symmetric mapping where the bits selecting inner rows have the same values and the bits selecting inner columns have the same values like e.g. in FIG. 7b are the following:

| Rearrangement and inversion | | Number | FIG. |
|---|---|---|---|
| $i_1 q_1 i_2 q_2 \leftrightarrow$ | $\begin{cases} \alpha\beta\gamma\delta & 1^{st}\text{ version} \\ \overline{\delta}\gamma\beta\alpha & 2^{nd}\text{ version} \end{cases}$ | i) | 20 |
| $i_1 q_1 i_2 q_2 \leftrightarrow$ | $\begin{cases} \alpha\beta\gamma\delta & 1^{st}\text{ version} \\ \delta\gamma\overline{\beta\alpha} & 2^{nd}\text{ version} \end{cases}$ | ii) | 21 |
| $i_1 q_1 i_2 q_2 \leftrightarrow$ | $\begin{cases} \alpha\beta\gamma\delta & 1^{st}\text{ version} \\ \overline{\delta\gamma\beta\alpha} & 2^{nd}\text{ version} \end{cases}$ | iii) | 19 |
| $i_1 q_1 i_2 q_2 \leftrightarrow$ | $\begin{cases} \alpha\beta\gamma\delta & 1^{st}\text{ version} \\ \delta\overline{\gamma}\beta\alpha & 2^{nd}\text{ version} \end{cases}$ | iv) | 22 |
| $i_1 q_1 i_2 q_2 \leftrightarrow$ | $\begin{cases} \alpha\beta\gamma\delta & 1^{st}\text{ version} \\ \overline{\gamma}\overline{\delta}\alpha\beta & 2^{nd}\text{ version} \end{cases}$ | v) | 23 |
| $i_1 q_1 i_2 q_2 \leftrightarrow$ | $\begin{cases} \alpha\beta\gamma\delta & 1^{st}\text{ version} \\ \gamma\delta\overline{\alpha}\overline{\beta} & 2^{nd}\text{ version} \end{cases}$ | vi) | 18 |
| $i_1 q_1 i_2 q_2 \leftrightarrow$ | $\begin{cases} \alpha\beta\gamma\delta & 1^{st}\text{ version} \\ \gamma\delta\alpha\overline{\beta} & 2^{nd}\text{ version} \end{cases}$ | vii) | 24 |
| $i_1 q_1 i_2 q_2 \leftrightarrow$ | $\begin{cases} \alpha\beta\gamma\delta & 1^{st}\text{ version} \\ \gamma\overline{\delta\alpha}\beta & 2^{nd}\text{ version} \end{cases}$ | viii) | 17 |

The permutation and inversion operations are the same in both symmetrical cases, however the rearrangement effect as shown in FIGS. 17 to 24, produced by a particular permutation and inversion, is different.

For an asymmetric mapping where the bits selecting inner rows have the same values and the bits selecting inner columns have different values as shown in FIG. 7c, the following combinations of permutations and inversions are possible:

| Rearrangement and inversion | | Number | FIG. |
|---|---|---|---|
| $i_1 q_1 i_2 q_2 \leftrightarrow$ | $\begin{cases} \alpha\beta\gamma\delta & 1^{st}\text{ version} \\ \delta\gamma\beta\alpha & 2^{nd}\text{ version} \end{cases}$ | ix) | 22 |
| $i_1 q_1 i_2 q_2 \leftrightarrow$ | $\begin{cases} \alpha\beta\gamma\delta & 1^{st}\text{ version} \\ \overline{\delta}\gamma\beta\alpha & 2^{nd}\text{ version} \end{cases}$ | x) | 20 |
| $i_1 q_1 i_2 q_2 \leftrightarrow$ | $\begin{cases} \alpha\beta\gamma\delta & 1^{st}\text{ version} \\ \delta\gamma\beta\overline{\alpha} & 2^{nd}\text{ version} \end{cases}$ | xi) | 21 |
| $i_1 q_1 i_2 q_2 \leftrightarrow$ | $\begin{cases} \alpha\beta\gamma\delta & 1^{st}\text{ version} \\ \overline{\delta}\overline{\gamma}\beta\overline{\alpha} & 2^{nd}\text{ version} \end{cases}$ | xii) | 19 |
| $i_1 q_1 i_2 q_2 \leftrightarrow$ | $\begin{cases} \alpha\beta\gamma\delta & 1^{st}\text{ version} \\ \overline{\gamma}\overline{\delta}\alpha\beta & 2^{nd}\text{ version} \end{cases}$ | v) | 17 |
| $i_1 q_1 i_2 q_2 \leftrightarrow$ | $\begin{cases} \alpha\beta\gamma\delta & 1^{st}\text{ version} \\ \gamma\delta\alpha\overline{\beta} & 2^{nd}\text{ version} \end{cases}$ | vi) | 24 |
| $i_1 q_1 i_2 q_2 \leftrightarrow$ | $\begin{cases} \alpha\beta\gamma\delta & 1^{st}\text{ version} \\ \gamma\delta\overline{\alpha}\overline{\beta} & 2^{nd}\text{ version} \end{cases}$ | vii) | 18 |
| $i_1 q_1 i_2 q_2 \leftrightarrow$ | $\begin{cases} \alpha\beta\gamma\delta & 1^{st}\text{ version} \\ \gamma\overline{\delta\alpha}\beta & 2^{nd}\text{ version} \end{cases}$ | viii) | 23 |

For an asymmetric mapping where the bits selecting inner rows have different values and the bits selecting inner columns have the same values as shown in FIG. 7d, the following combinations of permutations and inversions are possible:

| Rearrangement and inversion | | Number | FIG. |
|---|---|---|---|
| $i_1 q_1 i_2 q_2 \leftrightarrow$ | $\begin{cases} \alpha\beta\gamma\delta & 1^{st}\text{ version} \\ \delta\gamma\beta\alpha & 2^{nd}\text{ version} \end{cases}$ | ix) | 19 |
| $i_1 q_1 i_2 q_2 \leftrightarrow$ | $\begin{cases} \alpha\beta\gamma\delta & 1^{st}\text{ version} \\ \overline{\delta}\gamma\overline{\beta}\alpha & 2^{nd}\text{ version} \end{cases}$ | x) | 21 |
| $i_1 q_1 i_2 q_2 \leftrightarrow$ | $\begin{cases} \alpha\beta\gamma\delta & 1^{st}\text{ version} \\ \delta\overline{\gamma}\beta\overline{\alpha} & 2^{nd}\text{ version} \end{cases}$ | xi) | 20 |
| $i_1 q_1 i_2 q_2 \leftrightarrow$ | $\begin{cases} \alpha\beta\gamma\delta & 1^{st}\text{ version} \\ \overline{\delta}\overline{\gamma}\overline{\beta}\overline{\alpha} & 2^{nd}\text{ version} \end{cases}$ | xii) | 22 |
| $i_1 q_1 i_2 q_2 \leftrightarrow$ | $\begin{cases} \alpha\beta\gamma\delta & 1^{st}\text{ version} \\ \overline{\gamma}\overline{\delta}\alpha\beta & 2^{nd}\text{ version} \end{cases}$ | v) | 24 |
| $i_1 q_1 i_2 q_2 \leftrightarrow$ | $\begin{cases} \alpha\beta\gamma\delta & 1^{st}\text{ version} \\ \gamma\delta\overline{\alpha}\overline{\beta} & 2^{nd}\text{ version} \end{cases}$ | vi) | 17 |
| $i_1 q_1 i_2 q_2 \leftrightarrow$ | $\begin{cases} \alpha\beta\gamma\delta & 1^{st}\text{ version} \\ \overline{\gamma}\delta\alpha\overline{\beta} & 2^{nd}\text{ version} \end{cases}$ | vii) | 23 |
| $i_1 q_1 i_2 q_2 \leftrightarrow$ | $\begin{cases} \alpha\beta\gamma\delta & 1^{st}\text{ version} \\ \gamma\overline{\delta}\overline{\alpha}\beta & 2^{nd}\text{ version} \end{cases}$ | viii) | 18 |

The permutation and inversion operations are the same in both asymmetrical cases, however the rearrangement effect as shown in FIGS. 17 to 24, produced by a particular permutation and inversion, is different.

In case more than two versions are required (three or more transmissions of the same bits α, β, γ, δ), a third version is not required to have a special relation to the first or second version. However the relation between the bits in a third and fourth version should follow the same rules as given above. It is important to note however that the relation between first and second version does not have to be the same as between third and fourth version.

Figure 1:
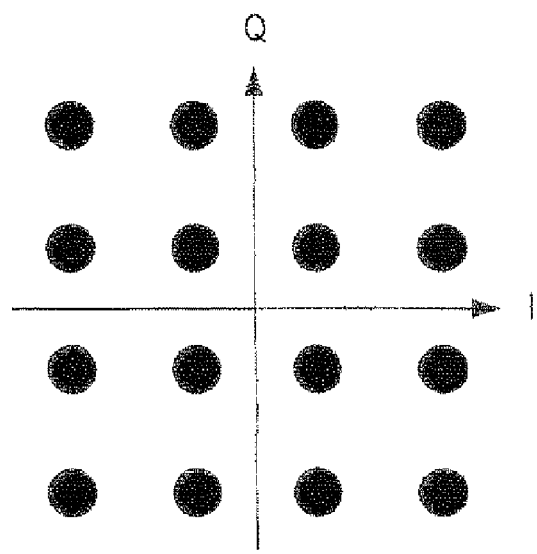
FIG. 1 illustrates modulation states of a square 16-QAM.
Figure 2:
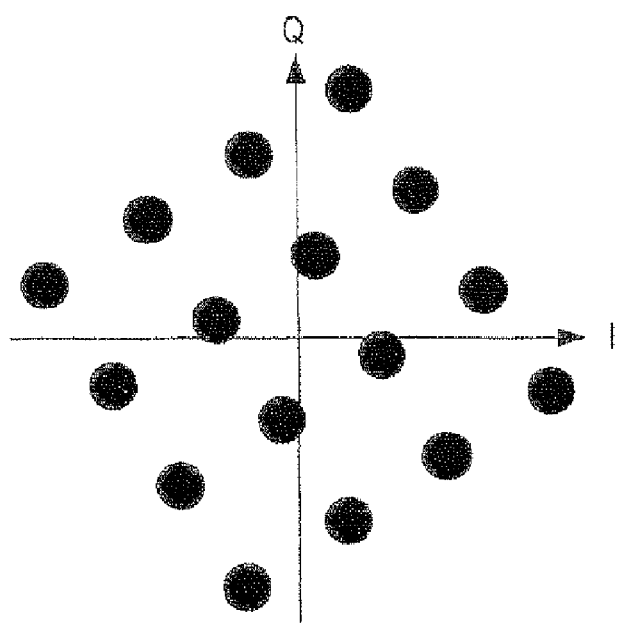
FIG. 2 shows an example of a rotated 16-QAM constellation.

It should be apparent to those skilled in the art that the description so far referred to real and imaginary axes of AICO mapping for a representation of a 16-QAM constellation as shown in FIG. 1. In the case of considering a rotated constellation as for example shown in FIG. 2, the orthogonal axes would have to be likewise rotated. In particular the terms "rows" and "columns" as they have been used so far would have to be interpreted as rotated "rows" and "columns" respectively.

Figure 27:
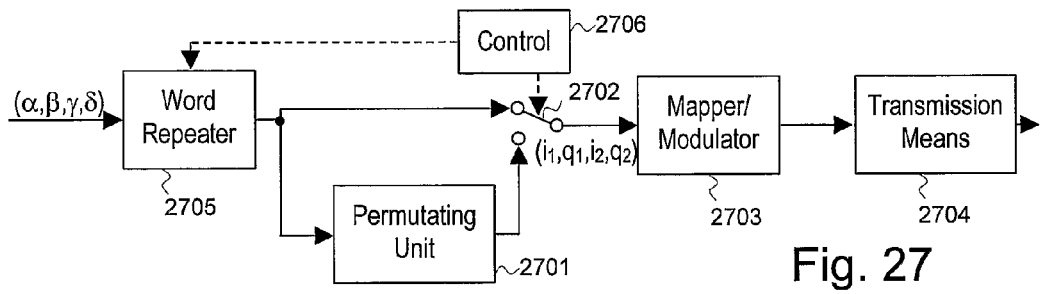
FIGS. 27 to 29 illustrate exemplary transmitter structures.
Figure 29:
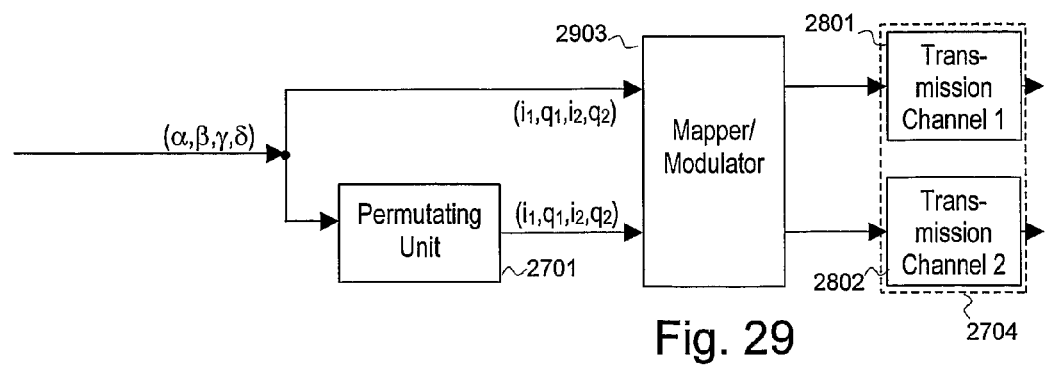
Figure 30:
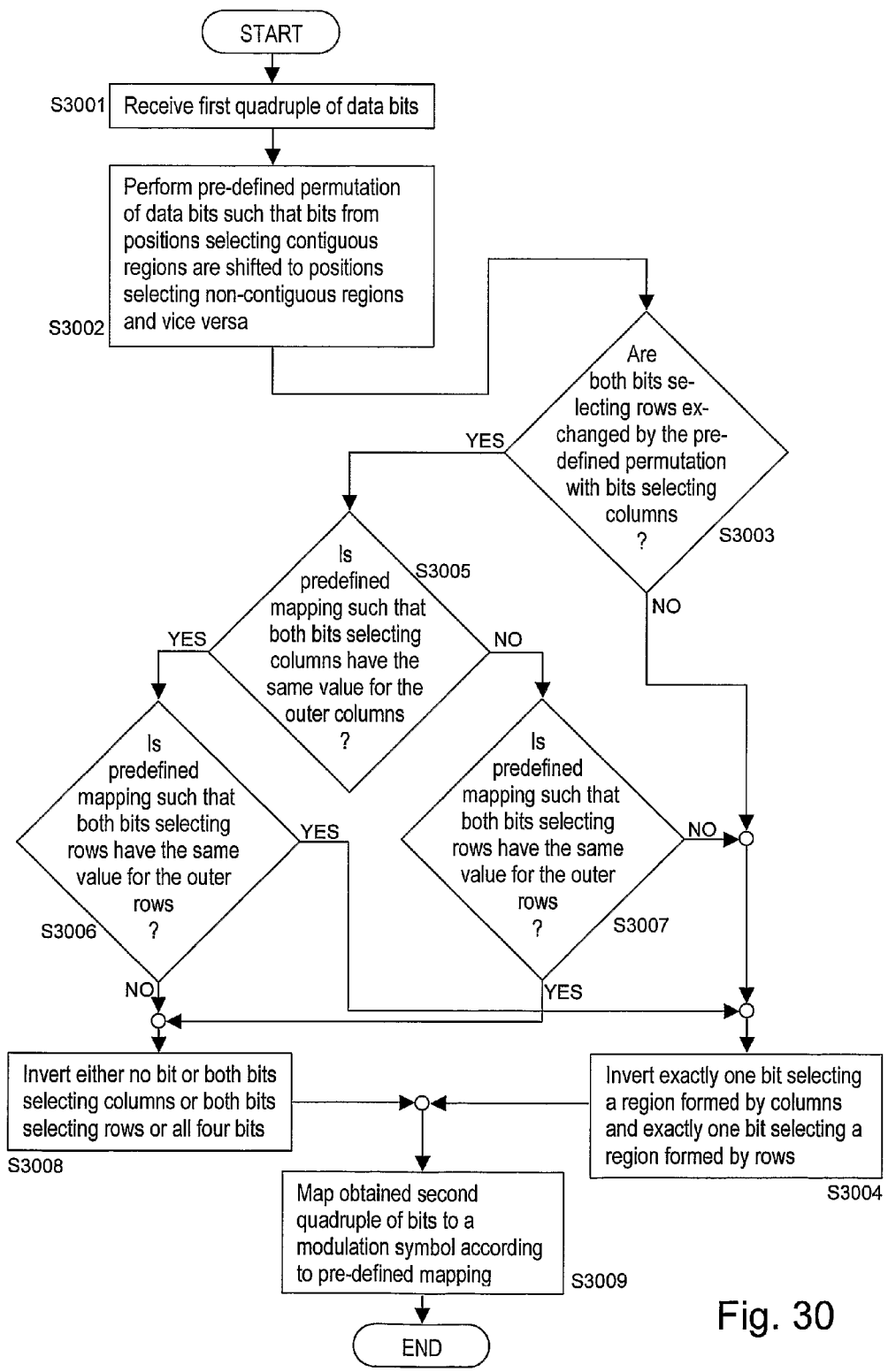
FIG. 30 depicts a flow diagram with the steps of the disclosed method.

FIG. 30 summarizes the steps of the method for the transmitter side, as they can be used for example in permutating unit 2701 in conjunction with mapper/modulator unit 2703 or 2903 in FIGS. 27-29. S3001 receives a first quadruple of data bits, either from within the same apparatus or from a remote apparatus. S 3002 performs the pre-defined permutation with the properties specified further above. In S3003 it is queried whether bits selecting rows are exchanged by the permutation with bits selecting columns or not. If not, exactly one bit selecting a region formed by columns and exactly one bit selecting a region formed by rows is inverted in S3004. Referring back to S3003, if "yes", then S3005 to S3007 query whether the pre-defined mapping is such that both bits selecting columns have the same value for the outer columns and if both bits selecting rows have the same value for the outer rows of the complex constellation of modulation states. If both are "yes" or both are "no", the method continues with S3004, described above. If one is "yes" and the other one is "no", S3008 either inverts both bits selecting columns, inverts both bits selecting rows, inverts all bits or inverts no bit. Finally, S3009 maps the second quadruple of data bits, thus obtained from the first quadruple of data bits, to a modulation symbol according to the pre-defined AICO-mapping.

To make use of the advantages of the present invention, a plurality of transmitted symbols corresponding to the same first quadruple of data bits is combined during reception for an improved detection of the values of the four data bits.

Depending on the receiver apparatus strategy, the metrics associated with the individual bits in the data words may have different definitions and different value ranges. For example, if the decoding is performed using soft values, the metric may be a likelihood value or likelihood values indicating the probability of whether an individual data bit has a logical value of 0 or 1. For this purpose, the metric may be for example a log likelihood ratio (LLR) which is defined by $$LLR(x_i) = \log \frac{p(x_i = 1)}{p(x_i = 0)},$$

wherein $p(x_i=1)$ is the probability that the bit $x_i$ is equal to the logical value of 1 and $p(x_i=0)$ is the probability that the bit $x_i$ is equal to the logical value of 0. Thus, the sign of the LLR directly indicates the logical value of the bit $x_i$ and the absolute value of the LLR indicates the certainty of the decision. When working with LLRs at a receiving apparatus, the reconstructed data bit may be reconstructed from a data bit pair (data bit and its repetition according to the two diversity branches)—for example—by simply adding the LLRs of the data bits of the data bit pair, and the logical value of the reconstructed data bit may be decided based on the sign of the sum of the LLRs.

Figure 31:
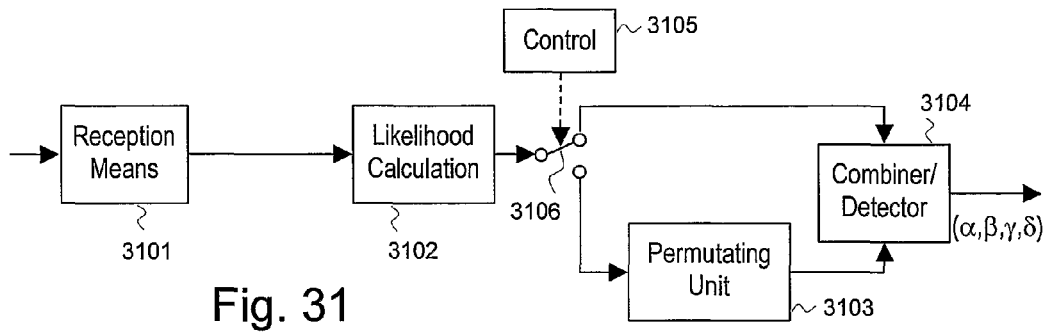
FIGS. 31 to 33 illustrate exemplary receiver structures.

FIG. 31 illustrates the reconstruction of the data bit streams from the received symbols. All antennas, RF and IF circuitry are summarized in reception means 3101 which receives the two transmitted symbols. As the invention is not limited to wireless transmission, the symbols could also be received from a twisted pair cable, a coaxial cable or from optical fibre, in which case reception means 3101 would be appropriately adapted. Likelihood calculation unit 3102 determines quadruples of likelihood values, one likelihood value for each received data bit comprised within a symbol. For this calculation, the pre-defined AICO mapping is taken into account. As the data bits have been permutated and possibly partly inverted for the second and further symbols, it is not possible to directly combine likelihood values from identical positions within the quadruples. Instead, the likelihood values within the second quadruple obtained from the second received symbol have to undergo a certain permutation and modification in permutating unit 3103. The permutation and modification has to be complementary to the permutation and inversion of the data bits employed in the transmitter e.g. in unit 2701. Due to the symmetric properties of the permutation rules, the possible permutation of likelihood values follows the same rules as described above for the data bits. Instead of the bit inversion, the likelihood values have to be modified so as to obtain a complementary value. For example, if the likelihood value expresses a certain likelihood that a received bit has the value "1", and the respective data bit is known to have been inverted prior to the mapping, the likelihood value has to be replaced by the respective likelihood value for the bit value "0". For a LLR, the sign has to be inverted to obtain this result. If the likelihood value comprises a linear probability, the likelihood value $p_0$ that the bit has the value "0" is $1-p_1$, $p_1$ being the probability that the bit has the value "1". The modification of the likelihood values can be carried out before or after the permutation. However it will be understood that after the permutation likelihood values at positions within the quadruple different from those before the permutation have to be modified to obtain the desired result.

After the correct permutation and modifications, likelihood values pertaining to the same data bit are at the same position within each quadruple of likelihood values. Therefore it is possible to detect the values of the bits by combining the likelihood values from identical positions in combiner/detector 3104 which upon correct detection outputs the original quadruple of data bits for further processing.

Preferably in a system which employs additional FEC coding and decoding stages in transmitter and receiver respectively, combiner/detector 3104 only combines appropriate likelihood values and forwards these at the output without performing a hard decision on the bit values.

A control unit 3105 controls demultiplexer 3106 and combiner/detector 3104 appropriately such that the first quadruple of likelihood values is directly input to the combiner/detector and the second quadruple of likelihood values is routed through permutating unit 3103, and such that only quadruples of likelihood values are combined which belong together.

Figure 32:
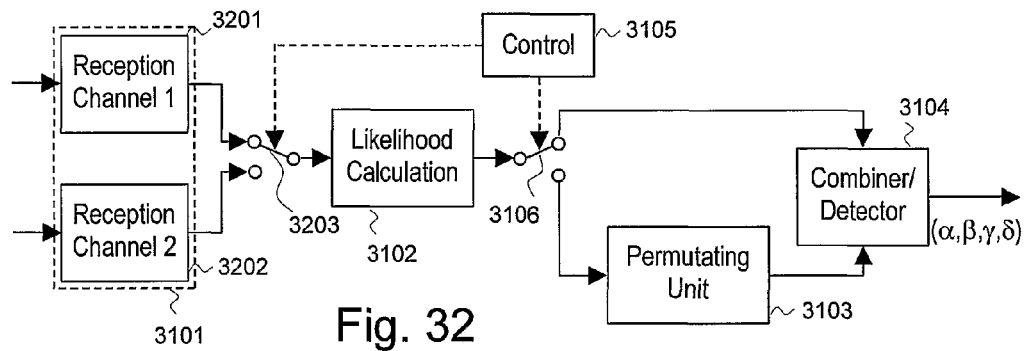
Figure 33:
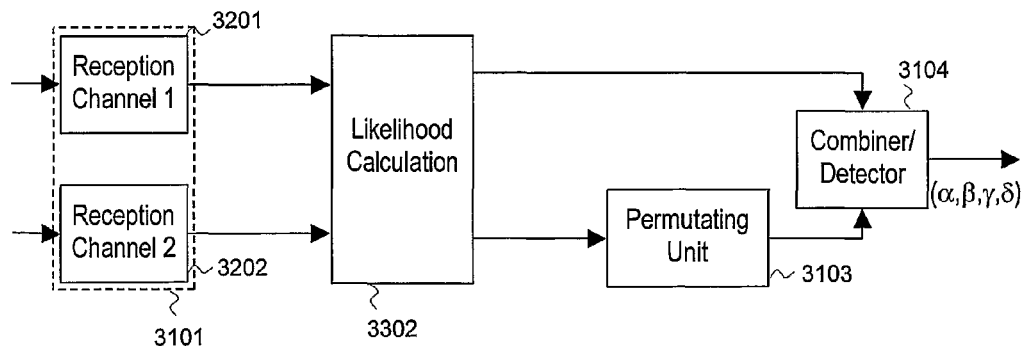

The first and the second symbol may be received from different transmission channels 3201, 3202, like shown in FIG. 32. In this case, control unit 3205 also controls a multiplexer 3203 in synchronicity with demultiplexer 3106. Alternatively a likelihood calculation unit 3302 with two inputs and two outputs may be used for simultaneous processing of both symbols, like shown in FIG. 33. If both symbols are received at different locations, one entity may comprise receiving means for reception channel 2, a separate likelihood calculation unit, and a permutating unit like described above. Such an apparatus may send quadruples of likelihood values to a combiner which may be located in a separate apparatus. Further different ways of separation of the units into apparatuses are also possible.

When working with hard decisions at the receiving apparatus, the metric may directly indicate the logical value of the respective data bit. Also in this case the combination of data bit pairs for reconstructing the (transmitted) data bit stream may simply add the metrics of the data bits of the bit pair. Also a combination with the use of soft decisions may be possible, i.e. before summing the logical values of the data bits of the data bit pair, same may be weighted using a probability value indicating the certainty in detecting the respective logical value.

Other embodiments of the present invention relate to the implementation of the above described various embodiments using hardware and software. It is recognized that the various above mentioned methods as well as the various logical blocks, modules, or circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Various embodiments of the present invention advantageously improve the physical bit reliability of data transmitted in a digital data transmission system using 16-QAM and transmit diversity. A further advantage is that transmission efficiency is maintained, as the improvement is achieved without additional transmissions and without modifying the transmission channels themselves (i.e. bandwidth, transmission power etc.). As another advantage, the method can be implemented with very simple bit operations, and therefore only very little additional processing power is required.

Possible applications of the present invention include, but are not limited to, mobile communication systems, satellite communication, and modems for wired digital subscriber lines.

While the invention has been described with respect to the embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method for modifying a quadruple of data bits in a data transmission system using Quadrature Amplitude Modulation with 16 different modulation states, 16-QAM, in which a quadruple of data bits is mapped to a modulation symbol according to logical values and positions of said bits within said quadruple and according to a pre-defined mapping, wherein in the pre-defined mapping of bit value combinations to complex modulation states four bits in a quadruple of data bits are mapped to a modulation symbol, such that
   i) a bit on a first one of the four bit positions selects one of two contiguous regions of the 16-QAM modulation states based on its logical value, each of the two contiguous regions being formed by two rows adjacent to each other;
   ii) a bit on a second one of the four bit positions selects one of two contiguous regions of the 16-QAM modulation states based on its logical value, each of the two contiguous regions being formed by two columns adjacent to each other;
   iii) a bit on a third one of the four bit positions selects one of two non-contiguous regions of the 16-QAM modulation states based on its logical value, each of the two non-contiguous regions being formed by two rows not adjacent to each other; and
   iv) a bit on a fourth one of the four bit positions selects one of two non-contiguous regions of the 16-QAM modulation states based on its logical value, each of the two non-contiguous regions being formed by two columns not adjacent to each other,
the method comprising the steps of:
   a) receiving a first quadruple of data bits;
   b) performing a pre-defined permutation of data bits within the first quadruple of data bits to obtain a second quadruple of data bits, wherein bits from positions in said first quadruple selecting contiguous symbol regions are shifted to positions in said second quadruple selecting non-contiguous symbol regions, and bits from positions in said first quadruple selecting non-contiguous symbol regions are shifted to positions in said second quadruple selecting contiguous symbol regions; and
   c) mapping data bits from the second quadruple to a modulation symbol according to their position in the quadruple and according to the pre-defined mapping of bit value combinations to complex modulation states.

2. The method of claim 1, wherein in the pre-defined permutation of data bits either both bits selecting rows in the first quadruple are shifted to positions selecting rows in the second quadruple, or both bits selecting rows in the first quadruple are shifted to positions selecting columns in the second quadruple.

3. The method of claim 2 further comprising prior to step c) the step:
   d) inverting exactly one bit selecting a region formed by columns and inverting exactly one bit selecting a region formed by rows, if in said pre-defined permutation of bits both bits from positions selecting rows in said first quadruple are shifted to positions selecting rows in said second quadruple.

4. The method of claim 2, further comprising prior to step c) the step:
   d) inverting exactly one bit selecting a region formed by columns and inverting exactly one bit selecting a region formed by rows, if in said pre-defined permutation of bits both bits from positions selecting rows in said first quadruple are shifted to positions selecting columns in said second quadruple, and if the pre-defined mapping is such that both bits selecting regions formed by columns have the same value for the outer columns and both bits selecting regions formed by rows have the same value for the outer rows, or if the pre-defined mapping is such that both bits selecting regions formed by columns have different values for the outer columns and both bits selecting regions formed by rows have different values for the outer rows.

5. The method of claim 2 further comprising prior to step c) the step:
   e) inverting either two bits selecting regions formed by columns, or inverting two bits selecting regions formed by rows, or inverting all four bits, if in said pre-defined permutation of bits both bits from positions selecting rows in said first quadruple are shifted to positions selecting columns in said second quadruple, and if the pre-defined mapping is such that both bits selecting regions formed by columns have the same value for the outer columns and both bits selecting regions formed by rows have different values for the outer rows, or if the pre-defined mapping is such that both bits selecting regions formed by columns have different values for the outer columns and both bits selecting regions formed by rows have the same value for the outer rows.

6. The method of claim 1 further comprising the steps of:
mapping said first quadruple of data bits to a first modulation symbol according to said pre-defined mapping; and
transmitting said first and said second modulation symbol, wherein the transmissions of said first and said second modulation symbol are differing in at least one of a physical channel, a transmission medium, a transmission frequency, a transmission time, a transmission code, a polarization of a transmission wave, and an antenna location.

7. An apparatus for modifying a quadruple of data bits in a data transmission system using Quadrature Amplitude Modulation with 16 different modulation states, 16-QAM, in which a quadruple of data bits is mapped to a modulation symbol according to logical values and positions of said bits within said quadruple and according to a pre-defined mapping, wherein in the pre-defined mapping of bit value combinations to complex modulation states four bits in a quadruple of data bits are mapped to a modulation symbol, such that:
  i) a bit on a first one of the four bit positions selects one of two contiguous regions of the 16-QAM modulation states based on its logical value, each of the two contiguous regions being formed by two rows adjacent to each other;
  ii) a bit on a second one of the four bit positions selects one of two contiguous regions of the 16-QAM modulation states based on its logical value, each of the two contiguous regions being formed by two columns adjacent to each other;
  iii) a bit on a third one of the four bit positions selects one of two non-contiguous regions of the 16-QAM modulation states based on its logical value, each of the two non-contiguous regions being formed by two rows not adjacent to each other; and
  iv) a bit on a fourth one of the four bit positions selects one of two non-contiguous regions of the 16-QAM modulation states based on its logical value, each of the two non-contiguous regions being formed by two columns not adjacent to each other,
the apparatus comprising:
a permutating unit configured to perform a pre-defined permutation of data bits within the first quadruple of data bits to obtain a second quadruple of data bits, wherein bits from positions in said first quadruple selecting contiguous symbol regions are shifted to positions in said second quadruple selecting non-contiguous symbol regions, and bits from positions in said first quadruple selecting non-contiguous symbol regions are shifted to positions in said second quadruple selecting contiguous symbol regions; and
a mapper configured to map data bits from the second quadruple to a modulation symbol according to their position in the quadruple and according to the pre-defined mapping of bit value combinations to complex modulation states.

8. The apparatus of claim 7, wherein the permutating unit is further configured to either shift both bits selecting rows in the first quadruple to positions selecting rows in the second quadruple and both bits selecting columns in the first quadruple are shifted to positions selecting columns in the second quadruple, or to shift both bits selecting rows in the first quadruple to positions selecting columns in the second quadruple and both bits selecting columns in the first quadruple to positions selecting rows in the second quadruple.

9. The apparatus of claim 8, wherein the permutating unit is further configured to invert exactly one bit selecting a region formed by columns and to invert exactly one bit selecting a region formed by rows, if in said pre-defined permutation of bits both bits from positions selecting rows in said first quadruple are shifted to positions selecting rows in said second quadruple and if both bits from positions selecting columns in said first quadruple are shifted to positions selecting columns in said second quadruple.

10. The apparatus of claim 8, wherein the permutating unit is further configured to invert exactly one bit selecting a region formed by columns and to invert exactly one bit selecting a region formed by rows, if in said pre-defined permutation of bits both bits from positions selecting rows in said first quadruple are shifted to positions selecting columns in said second quadruple and if both bits from positions selecting columns in said first quadruple are shifted to positions selecting rows in said second quadruple, and if the pre-defined mapping is such that both bits selecting regions formed by columns have the same value for the outer columns and both bits selecting regions formed by rows have the same value for the outer rows, or if the pre-defined mapping is such that both bits selecting regions formed by columns have different values for the outer columns and both bits selecting regions formed by rows have different values for the outer rows.

11. The apparatus of claim 8, wherein the permutating unit is further configured to invert either two bits selecting regions formed by columns, or to invert two bits selecting regions formed by rows, or to invert all four bits, if in said pre-defined permutation of bits both bits from positions selecting rows in said first quadruple are shifted to positions selecting columns in said second quadruple and if both bits from positions selecting columns in said first quadruple are shifted to positions selecting rows in said second quadruple, and if the pre-defined mapping is such that both bits selecting regions formed by columns have the same value for the outer columns and both bits selecting regions formed by rows have different values for the outer rows, or if the pre-defined mapping is such that both bits selecting regions formed by columns have different values for the outer columns and both bits selecting regions formed by rows have the same value for the outer rows.

12. The apparatus of claim 7, wherein the mapper is further configured to map said first quadruple of data bits to a first modulation symbol according to said pre-defined mapping; and
  the apparatus further comprises a transmission unit configured to transmit said first and said second modulation symbol, wherein the transmissions of said first and said second modulation symbol are differing in at least one of a physical channel, a transmission medium, a transmission frequency, a transmission time, a transmission code, a polarization of a transmission wave, and an antenna location.

13. A method for modifying a quadruple of likelihood values for receiving data transmitted using Quadrature Amplitude Modulation with 16 different modulation states, 16-QAM, in which a quadruple of data bits is mapped to a modulation symbol according to logical values and positions of said bits within said quadruple and according to a pre-defined mapping, wherein in the pre-defined mapping of bit value combinations to complex modulation states four bits in a quadruple of data bits are mapped to a modulation symbol, such that:

i) a bit on a first one of the four bit positions selects one of two contiguous regions of the 16-QAM modulation states based on its logical value, each of the two contiguous regions being formed by two rows adjacent to each other;
   ii) a bit on a second one of the four bit positions selects one of two contiguous regions of the 16-QAM modulation states based on its logical value, each of the two contiguous regions being formed by two columns adjacent to each other;
   iii) a bit on a third one of the four bit positions selects one of two non-contiguous regions of the 16-QAM modulation states based on its logical value, each of the two non-contiguous regions being formed by two rows not adjacent to each other; and
   iv) a bit on a fourth one of the four bit positions selects one of two non-contiguous regions of the 16-QAM modulation states based on its logical value, each of two non-contiguous regions being formed by two columns not adjacent to each other, the method comprising the steps of:
   a) receiving a second symbol representing a second quadruple of data bits obtained from a first quadruple of data bits by a pre-defined permutation of the data bits within the quadruple, wherein data bits from the second set of quadruples are mapped to modulation symbols according to their position in the quadruple and according to said pre-defined mapping of bit value combinations to complex modulation states;
   b) determining a second quadruple of likelihood values from the received second symbol, wherein each likelihood value in the second quadruple of likelihood values corresponds to the bit having the same position in the second quadruple of data bits; and
   c) performing a pre-defined permutation of the likelihood values within the second quadruple of likelihood values to obtain a third quadruple of likelihood values, wherein likelihood values from positions corresponding to bits of the second quadruple of bits selecting a contiguous region of complex modulation states are shifted to positions corresponding to bits of the second quadruple selecting a non-contiguous region of complex modulation states, and likelihood values from positions corresponding to bits of the second quadruple of bits selecting a non-contiguous region of complex modulation states, are shifted to positions corresponding to bits of the second quadruple selecting a contiguous region of complex modulation states.

14. The method of claim 13, wherein in the pre-defined permutation of likelihood values either both likelihood values corresponding to bits selecting rows in the first quadruple are shifted to positions corresponding to bits selecting rows in the second quadruple and both likelihood values corresponding to bits selecting columns in the first quadruple are shifted to positions corresponding to bits selecting columns in the second quadruple, or both likelihood values corresponding to bits selecting rows in the first quadruple are shifted to positions corresponding to bits selecting columns in the second quadruple and both likelihood values corresponding to bits selecting columns in the first quadruple are shifted to positions corresponding to bits selecting rows in the second quadruple.

15. The method of claim 14, further comprising after step b) the step:
   d) modifying exactly one likelihood value corresponding to a bit selecting a region formed by columns and modifying exactly one likelihood value corresponding to a bit selecting a region formed by rows, to obtain respective complementary likelihood values, if in said pre-defined permutation of likelihood values both likelihood values from positions corresponding to bits selecting rows in said first quadruple are shifted to positions corresponding to bits selecting rows in said second quadruple and if both likelihood values from positions corresponding to bits selecting columns in said first quadruple are shifted to positions corresponding to bits selecting columns in said second quadruple.

16. The method of claim 14, further comprising after step b) the step:
   d) modifying exactly one likelihood value corresponding to a bit selecting a region formed by columns and modifying exactly one likelihood value corresponding to a bit selecting a region formed by rows, to obtain respective complementary likelihood values, if in said pre-defined permutation of likelihood values both likelihood values from positions corresponding to bits from positions selecting rows in said first quadruple are shifted to positions corresponding to bits selecting columns in said second quadruple and if both likelihood values from positions corresponding to bits from positions selecting columns in said first quadruple are shifted to positions corresponding to bits selecting rows in said second quadruple, and if the pre-defined mapping is such that both bits selecting regions formed by columns have the same value for the outer columns and both bits selecting regions formed by rows have the same value for the outer rows, or if the pre-defined mapping is such that both bits selecting regions formed by columns have different values for the outer columns and both bits selecting regions formed by rows have different values for the outer rows.

17. The method of claim 14, further comprising after step b) the step:
   e) modifying either two likelihood values corresponding to bits selecting regions formed by columns, or modifying two likelihood values corresponding to bits selecting regions formed by rows, or modifying all four likelihood values, to obtain respective complementary likelihood values, if in said pre-defined permutation of likelihood values both likelihood values from positions corresponding to bits from positions selecting rows in said first quadruple are shifted to positions corresponding to bits selecting columns in said second quadruple and if both likelihood values from positions corresponding to bits from positions selecting columns in said first quadruple are shifted to positions corresponding to bits selecting rows in said second quadruple, and if the pre-defined mapping is such that both bits selecting regions formed by columns have the same value for the outer columns and both bits selecting regions formed by rows have different values for the outer rows, or if the pre-defined mapping is such that both bits selecting regions formed by columns have different values for the outer columns and both bits selecting regions formed by rows have the same value for the outer rows.

18. The method of claim 13, wherein the likelihood values comprise linear probabilities, and a complementary likelihood value is obtained by calculating 1 minus the respective original likelihood value.

19. The method of claim 13, wherein the likelihood values comprise logarithms of probability ratios, and a complementary likelihood value is obtained by inverting the sign of the respective original likelihood value.

20. The method of claim 13, further comprising the steps:
f) receiving a first symbol representing a first quadruple of data bits;
g) determining a first quadruple of likelihood values from the received first symbol, wherein each likelihood value in the first quadruple of likelihood values corresponds to the bit having the same position in the first quadruple of data bits; and
h) combining likelihood values from corresponding positions of the first and third quadruple of likelihood values to detect a value combination of the first quadruple of data bits.

21. A digital receiver system, for reception of digital data transmitted using Quadrature Amplitude Modulation with 16 different modulation states, 16-QAM, the digital receiver system comprising:
a) a receiving unit for receiving a symbol representing a second quadruple of data bits obtained from a first quadruple of data bits by a pre-defined permutation of the data bits within the first quadruple, wherein data bits from the first and second quadruples of bits are mapped to modulation symbols according to their position in the quadruple and according to a pre-defined mapping of bit value combinations to complex modulation states, and in the pre-defined mapping of bit value combinations to complex modulation states, four bits in a quadruple of data bits are mapped to a modulation symbol such that:
  i) a bit on a first one of the four bit positions selects one of two contiguous regions of the 16-QAM modulation states based on its logical value, each of the two contiguous regions being formed by two rows adjacent to each other;
  ii) a bit on a second one of the four bit positions selects one of two contiguous regions of the 16-QAM modulation states based on its logical value, each of the two contiguous regions being formed by two columns adjacent to each other;
  iii) a bit on a third one of the four bit positions selects one of two non-contiguous regions of the 16-QAM modulation states based on its logical value, each of the two non-contiguous regions being formed by two rows not adjacent to each other; and
  iv) a bit on a fourth one of the four bit positions selects one of two non-contiguous regions of the 16-QAM modulation states based on its logical value, each of the two non-contiguous regions being formed by two columns not adjacent to each other;
b) a likelihood value calculation unit for determining a second quadruple of likelihood values from the received second symbol, wherein each likelihood value in the quadruple of likelihood values corresponds to the bit having the same position in the corresponding quadruple of data bits;
c) a permutating unit with an input to receive the second quadruple of likelihood values, and an output, the permutating unit being configured to perform a pre-defined permutation of the likelihood values within the input quadruple of likelihood values to obtain a third quadruple of likelihood values for output, wherein likelihood values from positions corresponding to bits of the second quadruple of bits selecting a contiguous region of complex modulation states are shifted to positions corresponding to bits of the second quadruple of data bits selecting a non-contiguous region of complex modulation states, and likelihood values from positions corresponding to bits of the second quadruple of bits selecting a non-contiguous region of complex modulation states are shifted to positions corresponding to bits of the second quadruple of data bits selecting a contiguous region of complex modulation states.

22. The digital receiver system of claim 21, wherein the permutating unit is further configured to either shift both likelihood values corresponding to bits selecting rows in the first quadruple to positions corresponding to bits selecting rows in the second quadruple and both likelihood values corresponding to bits selecting columns in the first quadruple to positions corresponding to bits selecting columns in the second quadruple, or to shift both likelihood values corresponding to bits selecting rows in the first quadruple to positions corresponding to bits selecting columns in the second quadruple and both likelihood values corresponding to bits selecting columns in the first quadruple to positions corresponding to bits selecting rows in the second quadruple.

23. The digital receiver system of claim 22, wherein the permutating unit is further configured to modify exactly one likelihood value corresponding to a bit selecting a region formed by columns and to modify exactly one likelihood value corresponding to a bit selecting a region formed by rows, to obtain respective complementary likelihood values, if in said pre-defined permutation of likelihood values both likelihood values from positions corresponding to bits selecting rows in said first quadruple are shifted to positions corresponding to bits selecting rows in said second quadruple and if both likelihood values from positions corresponding to bits selecting columns in said first quadruple are shifted to positions corresponding to bits selecting columns in said second quadruple.

24. The digital receiver system of claim 22, wherein the permutating unit is further configured to modify exactly one likelihood value corresponding to a bit selecting a region formed by columns and to modify exactly one likelihood value corresponding to a bit selecting a region formed by rows, to obtain respective complementary likelihood values, if in said pre-defined permutation of likelihood values both likelihood values from positions corresponding to bits from positions selecting rows in said first quadruple are shifted to positions corresponding to bits selecting columns in said second quadruple and if both likelihood values from positions corresponding to bits from positions selecting columns in said first quadruple are shifted to positions corresponding to bits selecting rows in said second quadruple, and if the pre-defined mapping is such that both bits selecting regions formed by columns have the same value for the outer columns and both bits selecting regions formed by rows have the same value for the outer rows, or if the pre-defined mapping is such that both bits selecting regions formed by columns have different values for the outer columns and both bits selecting regions formed by rows have different values for the outer rows.

25. The digital receiver system of claim 22, wherein the permutating unit is further configured to modify either two likelihood values corresponding to bits selecting regions formed by columns, or to modify two likelihood values corresponding to bits selecting regions formed by rows, or to modify all four likelihood values, to obtain respective complementary likelihood values, if in said pre-defined permutation of likelihood values both likelihood values from positions corresponding to bits from positions selecting rows in said first quadruple are shifted to positions corresponding to bits selecting columns in said second quadruple and if both likelihood values from positions corresponding to bits from positions selecting columns in said first quadruple are shifted to positions corresponding to bits selecting rows in said second quadruple, and if the pre-defined mapping is such that both bits selecting regions formed by columns have the same value for the outer columns and both bits selecting regions formed by rows have different values for the outer rows, or if the pre-defined mapping is such that both bits selecting regions formed by columns have different values for the outer columns and both bits selecting regions formed by rows have the same value for the outer rows.

26. The digital receiver system of claim 21, wherein the likelihood values comprise linear probabilities, and the permutating unit is configured to obtain a complementary likelihood value by calculating 1 minus the respective original likelihood value.

27. The digital receiver system of claim 21, wherein the likelihood values comprise logarithms of probability ratios, and the permutating unit is configured to obtain a complementary likelihood value by inverting the sign of the respective original likelihood value.

28. The digital receiver system of claim 21, wherein;
the receiving unit is further configured to receive a first data symbol representing said first quadruple of data bits, wherein data bits from said first quadruple of bits are mapped to said first modulation symbol according to their position in the quadruple and according to said pre-defined mapping of bit value combinations to complex modulation states;
the likelihood value calculation unit is further configured to determine a first quadruple of likelihood values from the received first symbol, wherein each likelihood value in the quadruple of likelihood values corresponds to the bit having the same position in the corresponding quadruple of data bits; and
the digital receiver system further comprises a combiner with at least two inputs for combining likelihood values from corresponding positions of quadruples provided to the inputs, to detect a value combination of the first quadruple of data bits, wherein a first input of the combiner is configured to receive the first quadruple of likelihood values and a second input of the combiner is connected to the output of the permutating unit for receiving the third quadruple of likelihood values.

* * * * *